US012618317B2

(12) United States Patent　　　　(10) Patent No.: US 12,618,317 B2

Johnson　　　　　　　　　　　　　　(45) Date of Patent:　　May 5, 2026

(54) METHODS FOR PREDICTING AND ADAPTING TO HIGH FREQUENCY TORSIONAL OSCILLATION

(71) Applicant: Schlumberger Technology Corporation, Sugar Land, TX (US)

(72) Inventor: Ashley Bernard Johnson, Milton (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 69 days.

(21) Appl. No.: 18/721,015

(22) PCT Filed: Mar. 3, 2023

(86) PCT No.: PCT/US2023/063646

§ 371 (c)(1),
(2) Date: Jun. 17, 2024

(87) PCT Pub. No.: WO2023/168380

PCT Pub. Date: Sep. 7, 2023

(65) Prior Publication Data

US 2025/0059875 A1　　Feb. 20, 2025

Related U.S. Application Data

(60) Provisional application No. 63/268,803, filed on Mar. 3, 2022.

(51) Int. Cl.
*E21B 44/00*　　(2006.01)
*E21B 7/10*　　(2006.01)
*G01H 1/10*　　(2006.01)

(52) U.S. Cl.
CPC .............. *E21B 44/00* (2013.01); *G01H 1/10* (2013.01); *E21B 7/10* (2013.01)

(58) Field of Classification Search
CPC .............. E21B 44/00; E21B 7/10; G01H 1/10
See application file for complete search history.

(56) References Cited

U.S. PATENT DOCUMENTS

| | | | |
|---|---|---|---|
| 2011/0214878 A1 | 9/2011 | Bailey | |
| 2014/0338977 A1 | 11/2014 | Oueslati | |
| 2015/0083492 A1 | 3/2015 | Wassell | |
| 2016/0281489 A1* | 9/2016 | Dykstra | .................. E21B 7/046 |
| 2016/0348493 A1* | 12/2016 | Hohl | ......................... E21B 4/02 |
| 2017/0284185 A1 | 10/2017 | Hohl | |
| 2020/0018377 A1 | 1/2020 | Hohl et al. | |
| 2021/0270120 A1 | 9/2021 | Hohl | |
| 2022/0307365 A1* | 9/2022 | Al-AbdulJabbar | .... G06N 20/00 |
| 2022/0403731 A1 | 12/2022 | Johnson | |

\* cited by examiner

*Primary Examiner* — Dany E Akakpo
(74) *Attorney, Agent, or Firm* — Jeffrey D. Frantz

(57) ABSTRACT

An accurate and elegant model is provided to characterize HFTO. For Type 1 HFTO, the model can predict frequency of the HFTO based on the distance between a reference location on the bottomhole assembly (e g., the end of the drill bit) and a point 40% up the motor. In short BHA strings there is the fundamental frequency while in longer BHA the first harmonic is used. For Type 2 HFTO, the model can predict frequency of the HFTO based on distance between a reference location on the bottomhole assembly (e.g., the end of the drill bit) and the first slick contact point, which is optionally in the middle of a long flex joint.

7 Claims, 30 Drawing Sheets

METHODS FOR PREDICTING AND ADAPTING TO HIGH FREQUENCY TORSIONAL OSCILLATION

CROSS-REFERENCE TO RELATED APPLICATIONS

This application is a National Stage Entry of International Appl. No. PCT/US2023/063646, filed Mar. 3, 2023, which claims priority from U.S. Provisional Appl. No. 63/268,803, filed on Mar. 3, 2022, herein incorporated by reference in its entirety.

BACKGROUND

The dynamics of present-day drilling systems are complex. The bottomhole assembly (BHA), typically a long slender beam with a very high aspect ratio, suffers a myriad of instabilities. High-frequency torsional oscillation (HFTO), in which the BHA vibrates at frequencies above a few Hz, has been identified as a cause of damage to the drilling system. These damages can include cracks in collars, washouts, damage to electronic components, as well as over torqued joints or the back off of tool components.

Using high-speed data recorders, HFTO characteristics can be measured in drill bits. Examples include torsional oscillations at about 56 Hz, as well as other harmonics. Modelling may also be done to predict possible resonant frequencies. By adding additional memory logging tools into the BHA, the constraints that impact these vibration characteristics can be better understood. For instance, although there are multiple frequencies of torsional oscillations (from low frequency Stick Slip (f~0.2 Hz) to frequencies in excess of 300 Hz) which may appear in the same run, these different oscillations can also be mutually exclusive. Stringers can also trigger HFTO and the presence of HFTO can be seen as a marker for passing these hard formation boundaries.

SUMMARY

Methods and systems are provided that predict a position of a node for vibration in a drill string, which involves accessing a model that is based on vibration frequency and distance relative to a reference location on the drill string and using measured vibration frequency as input to the model to determine a location of the node in the drill string.

In embodiments, the model can include a linear function that relates characteristic frequency for the vibration to a length representing distance from the reference location on the drilling tool to a first significant node of the vibration.

In embodiments, the reference location on the drill string can be an end of the drill bit of the drill string.

In embodiments, the vibration can be high frequency torsional oscillation.

In embodiments, the model can be defined by correlating experimental data representing different types of high frequency torsional oscillation.

In embodiments, the methods and systems can further involve taking action in real time to mitigate effects of the vibration based on the location of the node. For example, the action can involve i) reducing or increasing dogleg severity, ii) back reaming, iii) changing drilling parameters, or iv) sending a request to change dogleg severity, back ream, or change drilling parameters.

In embodiments, the methods and systems can further involve using the location of the node in changing a design of the drill string to change at least one of frequency or location of the node. For example, the change in design can involve i) using the location of the node in identifying one or more wear bands placement locations, ii) replacing at least one heavy weight drill pipe with a collar or vice versa, or iii) changing a distance between components of the drill string and thereby moving a node to a less sensitive location.

In another aspect, methods and systems are provided that access a model that is based on vibration frequency and distance relative to a reference location on the bottomhole assembly and using the model in conjunction with design of the bottomhole assembly to predict vibration frequency in the bottomhole assembly.

In yet another aspect, methods are provided that measure frequency of high frequency torsional oscillation (HFTO) in a bottomhole assembly (BHA) and using a model that correlates frequency of the HFTO to distance relative to a reference location on the bottomhole assembly to identify a position of a HFTO node in the BHA. When the node is at a contact point in a curve of a drilled wellbore, the method involves reducing dogleg severity or sending a recommendation to reduce dogleg severity. When the node is at a contact point in a lateral of the drilled wellbore, the method involves back reaming or sending a recommendation to back ream. And when the node is in a motor of the BHA, the method involves changing drilling parameters or sending a recommendation to change drilling parameters.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Embodiments of the present disclosure relate to drilling systems. More particularly, some embodiments relate to drilling systems that undergo vibration that can damage the drilling system and detecting and mitigating such vibration. Torsional oscillations can be generated in a downhole drilling system during drilling activities. An oscillation node for the torsional oscillations may be located at contact points between the downhole drilling system and the wellbore well. Torsional stresses at the oscillation node may cause failure of one or more structural components of the downhole drilling system. Improved methods that predict the location of such torsional oscillations and mitigate such torsional oscillations are described herein.

Figure 1:
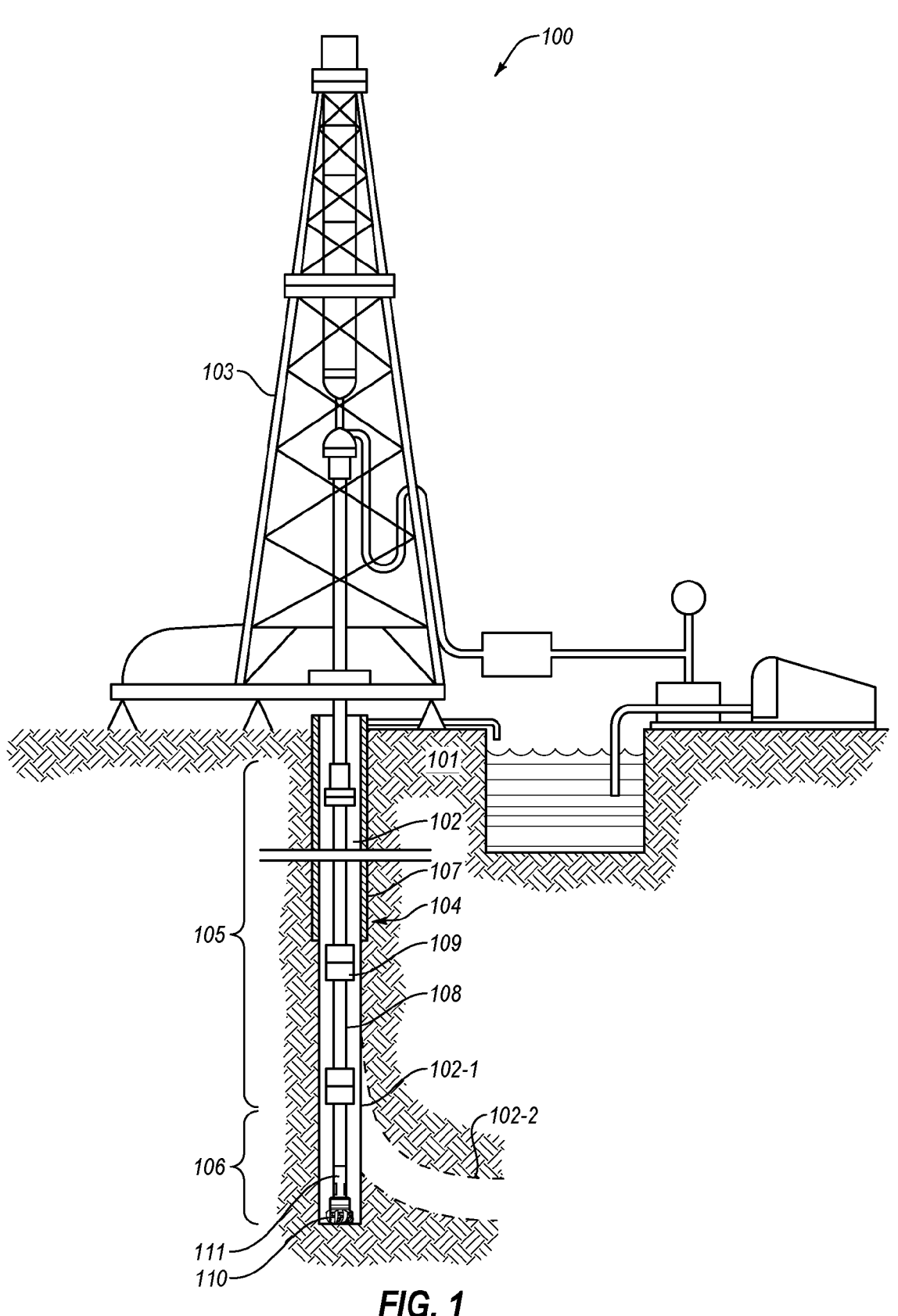
FIG. 1 is a representation of a downhole drilling system, according to at least one embodiment of the present disclosure.

By way of background, FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a bottomhole assembly (BHA) 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through nozzles, jets, or other orifices in the bit 110 for the purposes of cooling the bit 110 and cutting structures thereon, for lifting cuttings out of the wellbore 102 as it is being drilled, for controlling influx of fluids in the well, for maintaining the wellbore integrity, and for other purposes.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling (MWD) tools, logging-while-drilling (LWD) tools, downhole motors, underreamers, section mills, hydraulic disconnects, jars, vibration or damping tools, other components, or combinations of the foregoing. The BHA 106 may further include a directional tool 111 such as a bent housing motor or a rotary steerable system (RSS). The directional tool 111 may include directional drilling tools that change a direction of the bit 110, and thereby the trajectory of the wellbore. In some cases, at least a portion of the directional tool 111 may maintain a geostationary position relative to an absolute reference frame, such as gravity, magnetic north, or true north. Using measurements obtained with the geostationary position, the directional tool 111 may locate the bit 110, change the course of the bit 110, and direct the directional tool 111 on a projected trajectory. For instance, although the BHA 106 is shown as drilling a vertical portion 102-1 of the wellbore 102, the BHA 106 (including the directional tool 111) may instead drill directional or deviated well portions, such as directional portion 102-2.

In general, the drilling system 100 may include additional or other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

In some embodiments, the BHA 106 may include a downhole motor to power downhole systems and/or provide rotational energy for downhole components (e.g., rotate the bit 110, drive the directional tool 111, etc.). The downhole motor may be any type of downhole motor, including a positive displacement pump (such as a progressive cavity motor) or a turbine. In some embodiments, a downhole motor may be powered by the drilling fluid flowing through the drill pipe 108. In other words, the drilling fluid pumped downhole from the surface may provide the energy to rotate a rotor in the downhole motor. The downhole motor may operate with an optimal pressure differential or pressure differential range. The optimal pressure differential may be the pressure differential at which the downhole motor may not stall, burn out, overspin, or otherwise be damaged. In some cases, the downhole motor may rotate the bit 110 such that the drill string 105 may not be rotated at the surface, or may rotate at a different rate (e.g., slower) than the rotation of the bit 110.

The bit 110 in the BHA 106 may be any type of bit suitable for degrading downhole materials such as earth formation 101. Example types of drill bits used for drilling earth formations are fixed-cutter or drag bits, roller cone bits, and combinations thereof. In other embodiments, the bit 110 may be a mill used for removing metal, composite, elastomer, other downhole materials, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface or may be allowed to fall downhole. In still other embodiments, the bit 110 may include a reamer. For instance, an underreamer may be used in connection with a drill bit and the drill bit may bore into the formation while the underreamer enlarges the size of the bore.

During drilling, the BHA 106 will experience various vibrational and other forces, and the forces may vary (oftentimes significantly) between different tools or positions in the BHA 106. For instance, the directional tool 111 may include a mud motor or RSS, and torsional oscillations and resonance may occur below the directional tool 111 (or below the RSS or motor thereof). The oscillations and resonance below the directional tool 111 may be significantly different from oscillations above the motor or RSS. In some cases, pressure perturbations may drive oscillations through steering pads or cutters in an RSS and may not be as significant in other parts of the BHA 106.

High frequency torsional oscillations (HFTO) are a particular category of oscillations that occur within drilling tools and which can have a destructive impact. HFTO may be found in a frequency range of 60 to 350 Hz (along with harmonics) and can be primarily torsional; however, it should be understood that, in some situations, there may be a strong axial component accompanying HFTO. For instance, axial oscillations can be seen with frequencies up to 1200 Hz. In some cases, the axial component can even be dominant over the torsional oscillations. This behavior can be observed with a definitive correlation to acoustic noise in the mud system. Accordingly, high frequency oscillations (HFO) can be both torsional and axial in some embodiments. As used herein, HFO and HFTO may be considered for use interchangeably, and both can include torsional and axial oscillations. For instance, HFO with primarily axial oscillations may nonetheless be considered HFTO as the axial oscillations can be coupled to torsional oscillation or motion.

Two types of HFTO are discussed in accordance with embodiments of the present disclosure, although other types and categories of HFTO and HFO may exist. Type 1 HFTO may be associated with, for example, a drilling motor-powered RSS in a downhole drilling system. For example, Type 1 HFTO may be associated with a downhole motor in the drilling system. In some embodiments, the rotation of the downhole motor (e.g., the turbine, the rotor, or other rotatable element of the downhole motor) may cause or contribute to Type 1 HFTO. Type 1 HFTO may have a relatively low frequency and can include a single oscillation node. For example, Type 1 HFTO may have a frequency of less than 300 Hz, with some harmonics. In some embodiments, Type 1 HFTO may be associated with drilling a vertical or lateral wellbore and can affect the length of the BHA below the motor.

Type 2 HFTO may have a relatively higher frequency of greater than 300 Hz, or between 150 Hz and 350 Hz, and potentially with many harmonics. In some situations, Type 2 HFTO may occur in downhole drilling systems that include a downhole motor. In some situations, Type 2 HFTO may also occur in downhole drilling systems that do not include a downhole motor. Thus, the existence of Type 2 HFTO can generally be independent of the presence and/or operation of a downhole motor. In some embodiments, Type 2 HFTO may be present or located closer to the bit than Type 1 HFTO. Type 1 HFTO and Type 2 HFTO may also be mutually exclusive. Put another way, when Type 1 HFTO is present, significant Type 2 HFTO may not be present, and when Type 2 HFTO is present, significant Type 1 HFTO may not be present.

Type 2 HFTO may be present in a curved section of a wellbore. Put another way, Type 2 HFTO may exist while the BHA bends and curves through a dogleg of a wellbore. In some embodiments, Type 2 HFTO may be present while drilling through the dogleg, or while drilling a lateral section while the BHA is still located within the dogleg. In some embodiments, Type 2 HFTO may be more likely to occur, or more severe, in wellbores having smaller radius of curvature (e.g., a tighter dogleg).

Figure 2:
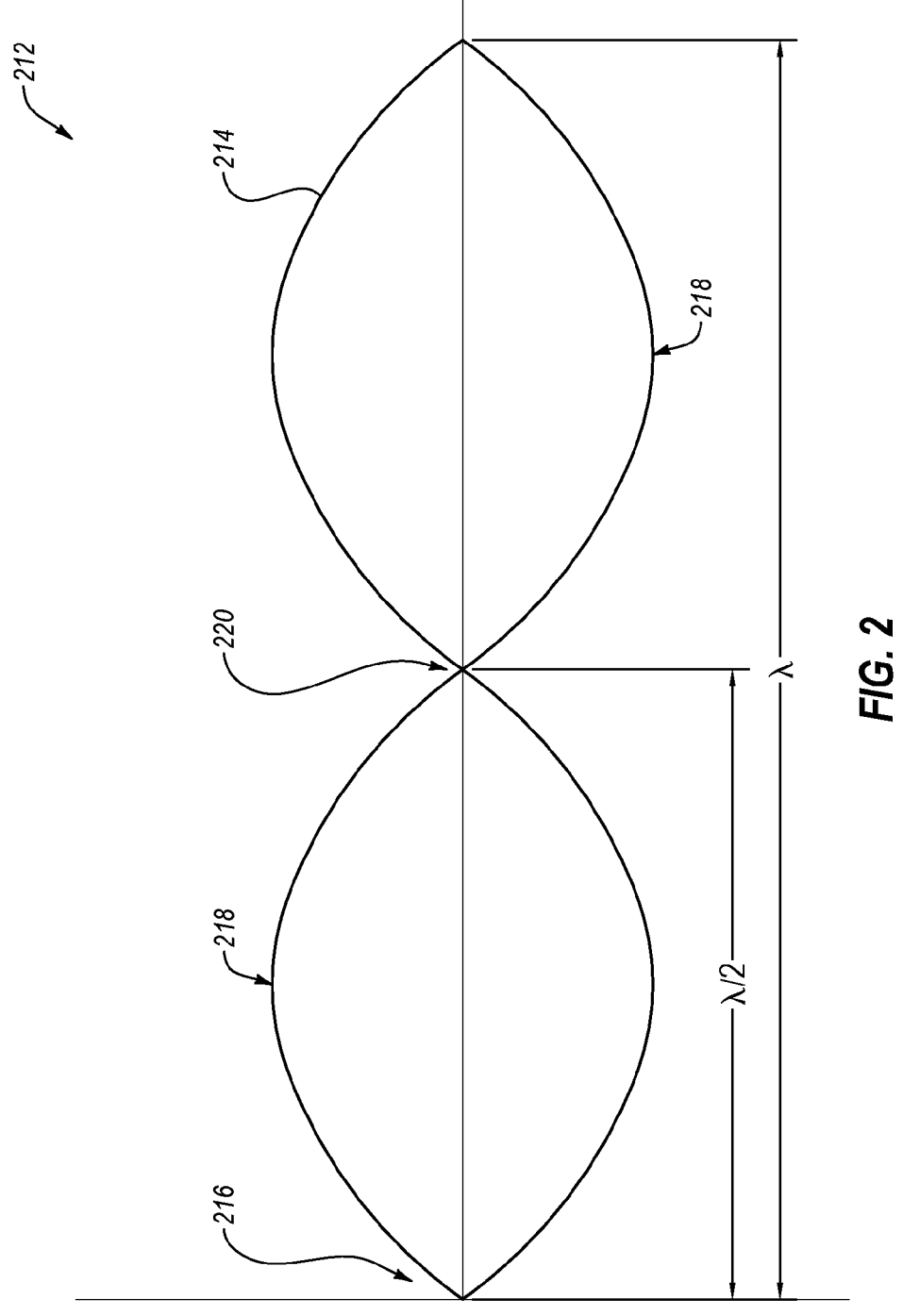
FIG. 2 is a representation of a waveform plot of high frequency torsional oscillation, according to at least one embodiment of the present disclosure.

To mitigate HFTO, an energy damping system may be installed in the BHA. Energy damping systems may include movable elements within the BHA or drill string that absorb vibrations and oscillations. Such energy damping systems may help to reduce the magnitude and/or frequency of the HFTO. However, these conventional approaches do not consider the location of nodes (or touch points with the wellbore that affect node locations as discussed herein). Such energy damping systems are typically effective at locations along the BHA or drill string that experience movement, rather than at nodes where there is high strain but low displacement, but conventional approaches do not distinguish between locations. As discussed herein, the vibrations from HFTO may form a wave in the BHA FIG. 2 is a waveform plot 212 of an HFTO waveform 214, with distance on the horizontal axis (e.g., x-axis) and amplitude on the vertical axis (e.g., y-axis), according to at least one embodiment of the present disclosure. The HFTO waveform 214 may have a wavelength of $\lambda$. The wavelength $\lambda$ may be the distance from a vibration or oscillation origin 216. As may be seen, the HFTO waveform 214 generally follows a sine wave, starting from the oscillation origin 216. The HFTO waveform 214 may increase in amplitude until it reaches a peak 218 or maximum amplitude. The amplitude may be considered the displacement distance of the BHA or drill pipe during HFTO. Thus, at the peak 218 of the HFTO waveform 214, the BHA may experience the maximum vibrational displacement.

After the peak 218, the HFTO waveform 214 may reduce in amplitude until an oscillation node 220. The oscillation node 220 may be at half of the wavelength $\lambda$, or $\lambda/2$. At the oscillation node 220, the amplitude is zero. This may result in no or limited displacement of the BHA during HFTO. The HFTO waveform 214 may then increase in amplitude past the oscillation node 220 (in the opposite direction) until reaching a peak 218 in the opposite direction. As discussed herein, displacement may be maximized at the respective peaks 218.

While experiencing minimized displacement at the oscillation node 220, torsional strain due to HFTO may be maximized at the oscillation node 220. In some situations, HFTO torsional strain may result in damage to the BHA. For example, HFTO torsional strain may result in weakening or failure (e.g., through cracking or breaking) of the housing or sub of an element of the BHA. In some examples, HFTO torsional strain may result in cracks or other breaks in plugs. In some examples, HFTO torsional strain may result in the buckling of a battery, electronics board, or other element of the BHA. In some examples, HFTO torsional strain may result in damage to a torquer (e.g., upper torquer) of an RSS. Damage to the elements of the BHA may result in additional cost for repair, additional time to trip out of the wellbore, time, and costs to replace damaged units, or even catastrophic failure of the BHA and separation of the BHA from the drill string.

As discussed herein, conventionally, to mitigate HFTO, an energy damping tool may be installed on the BHA; however, such energy damping tools typically mitigate the amplitude of the HFTO waveform 214, but do not significantly change the location of the oscillation node 220. Furthermore, such energy damping tools typically function by absorbing vibrational energy and would therefore be most effective when placed at the peak 218 of the HFTO waveform 214—while having reduced effectiveness if placed close to or at the oscillation node 220.

Figure 3:
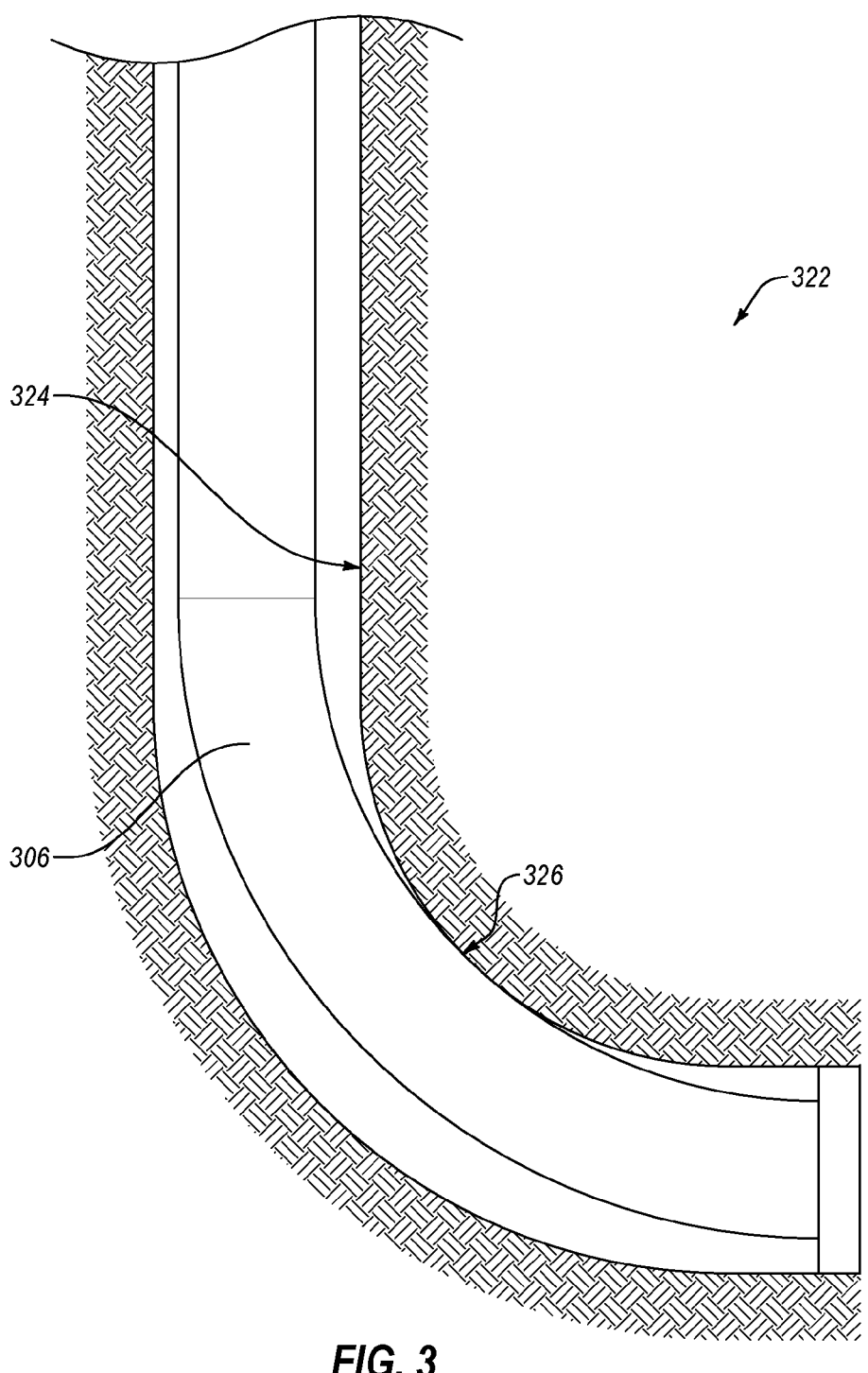
FIG. 3 is a representation of a dogleg in a wellbore, according to at least one embodiment of the present disclosure.

FIG. 3 is a representation of a dogleg in a wellbore, according to at least one embodiment of the present disclosure. As seen in the schematic wellbore dogleg 322 of FIG. 3, a BHA 306 may be bent to generally conform to the dogleg 322 or curved section of the wellbore. During bending, the BHA 306 may contact the wellbore wall 324 in a contact region 326. Contact of the BHA 306 with the wellbore wall 324 may increase friction and stiffen the BHA 306 at that location, thereby preventing the BHA 306 from certain types of vibration (e.g., Type 2 HFTO) or reducing certain types of vibration of the BHA 306 in the contact region 326. In some embodiments, this may cause an oscillation node (e.g., oscillation node 220 of FIG. 2) to form at the contact region 326.

Figure 4:
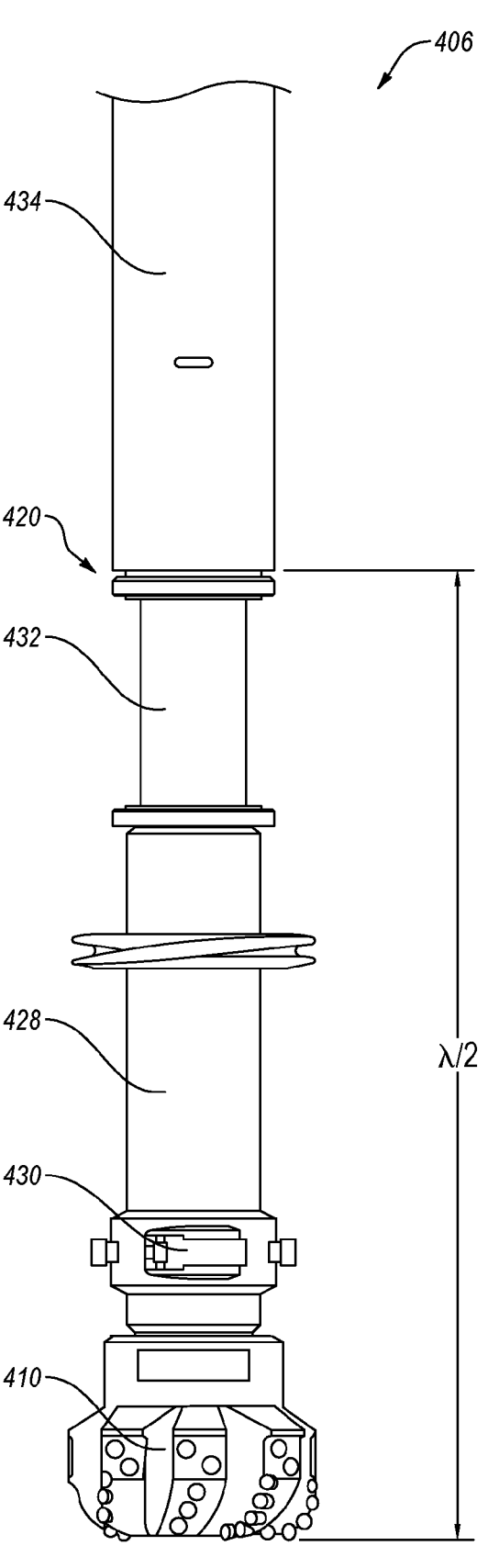
FIG. 4 is a representation of a bottomhole assembly, according to at least one embodiment of the present disclosure.

FIG. 4 is a representation of a BHA 406, according to at least one embodiment of the present disclosure. The BHA 406 includes a bit 410 connected to an RSS 428. The RSS 428 includes a plurality of steering pads 430. Contact with the steering pads 430 against the wellbore wall may change the direction of the bit 410. The contact of the steering pads 430 with the wellbore wall may not be sufficient to create an oscillation node.

The BHA 406 may include one or more downhole tools 432, such as flex joint, or other downhole tools 432. The BHA 406 may further include one or more additional subs 434, such as an MWD, an LWD, a mud motor, a reamer, or any other sub 434. As may be seen, the diameter of the RSS 428 and the downhole tool 432 may be less than the diameter of the sub 434. While drilling a dogleg, the sub 434 may contact the wellbore wall. In some embodiments, a contact location with the wellbore wall may have a contact length sufficient to generate an oscillation node (schematically represented at 420). As discussed herein, the oscillation node 420 may be located a length $k\lambda/2$ away from the bit 410, which acts as another node. Torsional strain at the oscillation node 420 may result in damage to one or more portions of the BHA 406, including the downhole tool 432, the sub 434, and/or internal components thereof.

While FIG. 4 illustrates oscillation nodes at the bit 410 and 420, it will be appreciated that a BHA can be a complex system with multiple nodes and contact points along a BHA or drill string. For instance, a directional drilling BHA may include a drill bit and an underreamer. Both the drill bit and underreamer may be used in an underreaming-while-drilling operation to degrade the formation, and both may form high friction oscillation nodes. A contact point between the bit 410 and underreamer may therefore define a first length $k\lambda 1/2$ with the bit 410 for HFO (e.g., Type 2), and a contact point either below or above the underreamer may form second length $\lambda(1+k)/2$ with the underreamer for HFO (e.g., Type 2). The first and second lengths may be the same or different. Consequently, the locations of the contact points associated with nodes at the bit 410 and underreamer (for example) may be evaluated in accordance with embodiments of the present disclosure to change the HFTO waveform and contact point/node location, or the location of an HFO mitigation device. By changing the associated oscillation node location for the bit 410 or underreamer, the displacement/amplitude, frequency, or other portions of the waveform may be changed. For instance, by increasing the $k\lambda/2$ length, the oscillation frequency may decrease. By decreasing oscillation frequency, the strain at the oscillation node may also decrease. Decreased oscillation frequency also results in fewer cycles over time, thereby reducing the likelihood of failure or damage due to fatigue.

Studies modelling drilling system dynamics have pursued prediction of HFTO, and in some cases have developed models of the mechanical system that produce predictions of the range of frequencies of the vibration as well as the impact of damping tools. However, the models presented have all neglected the impact of the hydraulic system and the damping due to frictional contact with the formation. Aspects of the present disclosure include considering the impact of a hydraulic system and damping due to frictional contact in the prediction of HFTO.

Figure 5:
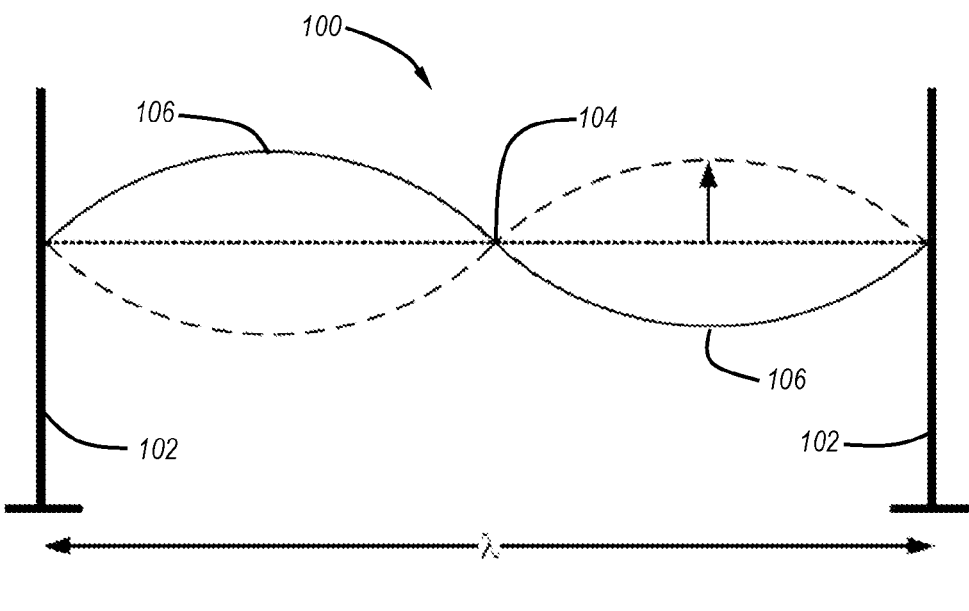
FIG. 5 is a schematic showing a suspension bridge's torsional wave amplitude along a length of the roadway, with a distance between bridge pillars being one wavelength, according to an aspect of the present disclosure.

When considering torsional oscillation of a long beam, one can look at the oscillation in the plane perpendicular to the axis at a single axial location. However, the amplitude variation of the oscillation along the beam should also be considered. One of the most famous examples of torsional oscillation of a long beam is the Tacoma Narrows suspension bridge. A schematic, line illustration of the torsional oscillation of the Tacoma Narrows bridge 100 is produced in FIG. 5. In the figure a full wavelength of the torsional oscillation is seen between the bridge pillars 102 with a node 104 at $\lambda/2$ and antinodes 106 at $\lambda/4$ and $3\lambda/4$. The node 104 is the point of no displacement, while the antinodes 106 have the maximum displacement. Interestingly, the fundamental mode for the bridge oscillation would have an antinode 106 in the center of the bridge 100. However, the support for this section is (vertically) stiffer forcing a node 104 at this point.

In terms of damage to mechanical components, the antinode 106 will have the higher acceleration while the node 104 has the highest torsional strain. When the bridge 100 ultimately failed, it fractured at the node 104 as a result of this torsional strain.

When drilling assemblies are considered, it is apparent that some information may be missing as measurements can be taken at localized positions. We thus can miss the spatial variation along the tool, although they are there. In terms of the detection, mitigation, and damage avoidance, the positions of the nodes 104 and antinodes 106 may provide useful information in some embodiments as these can drive different damage mechanisms.

The wavelength ($\lambda$) can be related to the frequency (f) of the vibration:

$$f = v/\lambda \qquad [1]$$

where v is the acoustic velocity. For continuous systems in torsional vibration, the velocity could be calculated from the equation:

$$v = \sqrt{C/\rho} \qquad [2]$$

where $\rho$ and C are the density and modulus of rigidity of the corresponding material (e.g., collar material). For a typical collar, this velocity can be between 9,000 ft/s (2,750 m/s) and 13,000 ft/s (3,950 m/s). For instance, the velocity can be 10,200 ft/s (3,100 m/s).

By way of illustration, an example BHA can have a resonant frequency of 100-300 Hz (e.g., 200 Hz), for which the estimated wavelength can be 35 ft. (11 m) to 75 ft. (23 m). In an example, the estimated wavelength is 51 ft. (16 m). Significant variation in the HFTO characteristics along the BHA can be expected with nodes and antinodes spatially distributed at a typical collar length spacing. Thus, considering how the BHA components couple with these vibrations can be informative.

The drilling BHA is an assembly of multiple elements, all of which will play a part in the system's dynamics. Examples of a drilling system can include, for instance, a drill bit, a directional drilling tool (e.g., a bent motor or rotary steerable), a measurement-while drilling (MWD) tool, a logging-while-drilling (LWD) tool, vibration dampers, downhole motors, drill pipes and tubulars, jars, underreamers, among others.

The nature of drilling/cutting can be a stochastic process, as such it can feed broad band torsional noise into the BHA and the drill string. This may then act as a source for any torsional oscillation, inclusive of HFTO. Drilling with more weight on bit (WOB) and rate of penetration (ROP) can trigger HFTO in some embodiments. In addition to the broad band energy from the drill bit and/or underreamer, any perturbations in WOB will couple into torque as will perturbations in flow rate and bit pressure drop.

In general, a drill bit has a higher torsional stiffness and polar moment of inertia than the rest of the BHA (often significantly higher) so it can be considered as a lumped mass. As such, perturbations in torque will couple to rotary speed and vice versa. The interaction between rotary speed and cutting torque is less certain. For instance, bit tests have shown a drop in torque as rotary speed increased, but only up to a threshold (e.g., up to 40 rpm for a particular bit design and test environment). There remains much speculation as to the mechanisms for this although no definitive conclusion has emerged. Industry simulators can require this negative torque tendency, in effect negative damping, in the bit model to trigger HFTO in the prediction. Due to the back-rake angle of the cutters on the drill bit, there can also be some coupling between torsional oscillation and axial vibration.

Steering tools are usually assumed to play a minimal part in the formation and characteristics of HFTO, apart from being components that are often damaged by HFTO. For instance, there are cases of excessive wear, cracking of the bearing housing, and erosion of flow restrictors in some steering tools.

This damage can occur where extreme cases of HFTO are present in the BHA. It is driven by flow back from the steering pads driving jets of fluid through a valve and hydraulic waves up past the steering tool control unit. This backflow is caused by the interaction between the steering pads and a ledge left by the near pad cutters driven by the HFTO vibrations.

The MWD, LWD, and other BHA instrumentation, are susceptible to the mechanical vibrations. Where the tool is located in close proximity to an HFTO node, the point of maximum torsional strain, multiple tool damage mechanisms can be seen. In some MWD or survey tools, bolts holding components together (e.g., a modulator) may then back off, a circuit board may be damaged, batteries may buckle, or washouts may occur at a gap sub.

As such tools also feature changes in the internal crosssection, they will also be susceptible to flow changes in the inner bore.

Various tools have been developed and are marketed for vibration damping, and some include marketing as HFTO dampers. HFTO dampers can generally be categorized into one of three categories, namely: (i) coupled torsional and axial; (ii) torsional dampers; and (iii) non-rotating sleeves. Examples of coupled devices include products available from Tomax AS of Stavanger, Norway and Scout Downhole of Conroe, Texas. Such tools use a screw thread to couple the torsional to axial displacements. As such, pressure perturbations inside the collar will couple into axial and torsional displacements. These tools can be more than 15 ft length, so they are limited in their BHA location and usually have to go above the MWD.

The SENTINAL tool available from SLB of Sugar Land, Texas is an example of a torsional damper. There will be no coupling between pressure waves and axial force due to changes in flow profile, but there will be coupling to the torsional vibration. The tool is only 7 ft in length so it could be mounted below the MWD, broadening its applicability.

The WTT SILENCER tool from WWT International located in Houston, Texas is an example of a non-rotating sleeve. The efficacy of such a tool is discussed herein, but as with the torsional dampers there should be no coupling between the torsional and axial channels.

In some analysis of HFTO, the motor can be considered as a free end for torsional oscillation. Effectively, the rotor is a reflector. The operation of the drilling motor generates rotary speed of the bit shaft from hydraulic power, the upper and lower collars being coupled through the rotor stator. However, neglecting accelerations, the torque in the collar above the motor will generally equal the torque below. As such there will be transmission of torsional vibration through the motor, although there will be some reflection. The actual dynamic reflection/transmission characteristics can be complicated, as is location of the node along the motor. Pressure drop across the motor is a function of the torque. So torsional oscillations will couple into the mud hydraulics with perturbations in flow and pressure propagating up the string and down towards the bit.

The periodic nature of the drill pipe means the propagation of torsional vibration along the string will be a function of frequency. There will be pass bands, frequencies where torsional vibration energy will propagate up the drill string and stop bands where vibrations will be trapped in the BHA. A resonance is more likely to grow and become dominant if the frequency is in one of the stop bands.

In the drilling industry, HFTO has often been assumed to be independent of the formation contacts. However, a touch point with an incomplete azimuth, a bladed stab for example, will inject torsional energy into the BHA, so it could drive HFTO. An azimuthally continuous contact is more likely to dampen vibrations. The scale of the damping will be a function of many parameters including, the side force, the coefficient of friction, the length of the contact as well as the rotary speed.

In Table 1, an example is shown of tools used for characterization of HFTO with detail on the sensors, mounting position, and recording characteristics. Each tool is described in more detail below.

The IDART tool has been used for various years as an internal tool of Schlumberger to detect HFTO. It is effective and durable. The anti-aliasing filters are set at about 320 Hz, so harmonics of higher frequency HFTO are not resolved, leaving the user with the impression there are no harmonics. It has no internal pressure, so there is no insight of the impact of hydraulics. It also has limited usage so although it has provided insights these are not sufficiently broad to develop a full understanding of HFTO.

Shock accelerometers are in the control unit of the POWERDRIVE tool, with the control unit mounted through rubber mounts and rotary bearings into the collar. As such it is weakly coupled to the collar for axial and lateral vibration and minimal mechanical coupling for torsional. The transducers are mounted on the CPU board which is offset from the center of the control unit. The radial shock transducer is, therefore, sensitive to the radial shock as well as to torsional acceleration of the control unit. If there is torsional vibration in the control unit it will appear on the radial shock signal. The offset of the CPU board (and thus the accelerometers) may be equal in x and y directions in a cross-sectional view of the tool. In other embodiments, however, the offset may be different. For instance, the offset may be between 10% and 95% larger in one direction (e.g., x direction) than the other direction (e.g., y direction), although this offset is illustrative only as in other embodiments the offset may be between 20% and 80%, or between 40% and 70% larger in one direction than the opposing direction.

The control unit is coupled through bearings to the drilling collar so there will be a small mechanical coupling through the bearing friction. However, in reality, this will be minimal compared to the polar moment of inertia of the control unit. The orientation of the control unit is controlled by the torque generated by hydraulic fan blades, "torquers" coupled to the control unit through electromagnetic coils. The controller for the coils has a response frequency of 20 Hz while the sensors have a low pass filter at 100 Hz. As such torque perturbations, above these frequencies, generated by the torquers will couple directly through to the control unit. Flow perturbations in the fluid channel round the control unit will drive the torquers and couple through to the control unit and hence be detected as accelerations in the radial shock sensor.

The detection of HFTO with the radial shock sensor is challenging. For a drilling system where HFTO generates hydraulic waves around the control unit, the system will detect the dysfunction. However, if the drilling tools do not

TABLE 1

| | Accel | Mounting | Sampling Rate | Anti-aliasing | Gyro | Pressure | Sampling Rate | Anti-aliasing | Data |
|---|---|---|---|---|---|---|---|---|---|
| IDART | Triaxial | At radius | 1.024 kHz | ~300 Hz | Yes | No | | | Continuous |
| POWER DRIVE | Biaxial | At CU on radius | 32 kHz | BW limited | No | No | | | Burst event trigger |
| X BOLT | Triaxial | Centerline of probe | 30 kHz | BW limited | No | Yes | 1 kHz | No | Burst |
| SYNAPSE | Triaxial | Centerline | 3.2 kHz, output rate 50 Hz | | Yes | No | 1125 Hz | 5.7 Hz or 361 Hz | Burst 10 s/ 10 min |
| OPTI DRILL | Triaxial | Radius | 10 kHz, output rate 50 Hz | Yes | Yes | Yes | 10 kHz, Output rate 50 Hz | No | Continuous |
| BLACK BOX | Triaxial | At radius | 1.5 kHz | None | Yes | Yes | 10 Hz | No | Continuous | couple to the hydraulics (e.g., without a drilling motor), the radial shock sensor may not detect the HFTO even if it is there.

The XBOLT MWD uses a probe based mounting system with the triaxial accelerometers mounted on the centerline of the probe. If all of the system was concentric then the lateral accelerometers would be insensitive to torsional oscillations. However, with some eccentricity, bending or misalignment, these will detect some torsional components. They will detect lateral accelerations coupled from the torsional oscillation or more significantly axial vibration.

An original system collected 9000 data point bursts once every 6 hours for each channel, once every 2 hours a new measurement would be received, although a later version provides a burst every 90 seconds. Other options can include collecting a single, one second burst of axial vibration once every minute. The lateral accelerometers can be interleaved with this data.

The SYNAPSE tool sits in a pocket above the bit mounted on the axis of the BHA. Originally the low pass filter was set to 5.7 Hz for the gyro; however, this can be up to 196 Hz or up to 361 Hz. The OPTIDRILL tool down samples its measurements to 50 Hz, so a direct measurement is unlikely to detect HFTO. However, the RMS of the original signal is recorded at 50 Hz so some insights can be gleaned from the data although this bandwidth is limited to 150 Hz. For instance, one data set was identified with HFTO at a frequency of 12 Hz detected in the gyro and the internal and external pressure, and within a drilling BHA using a steerable motor.

The BLACK BOX tool is an annular sensor tool from NOV of Houston, Texas. In addition to the acceleration measurements, it will also measure torque and weight, although these are both at 10 Hz. It will not have anti-aliasing filters so aliasing will occur with this tool.

From the equations above, the frequency and wavelength of torsional vibration are linked. Although the sound speed in the BHA components will not be constant it can be considered to have little variation. Accordingly, the frequency will vary inversely with the characteristic length. Fundamentally, the actual resonance will depend on the end points and the axial position of the nodes.

HFTO can occur across a range of different drilling systems, different bit/collar sizes, with and without a motor, and with different wellbore profiles and formation characteristics. These will have different coupling and boundary conditions depending upon, for example, the drill pipe, the use of a motor, and the character of the formation contact points. The bit will be similar, in terms of the torsional coupling, across all of the applications. It is torsionally stiffer than the rest of the string and has a higher polar inertia. It can be considered as a stiff lumped mass. As torque is used to drive the vibration, the bit will not be a node (zero displacement) or an antinode (zero torque). We can consider the relative phase between the torque and torsional acceleration will be the same across all cases, so we assume the fraction of a wavelength from the bit to the first node will be the same across all systems.

Figure 6:
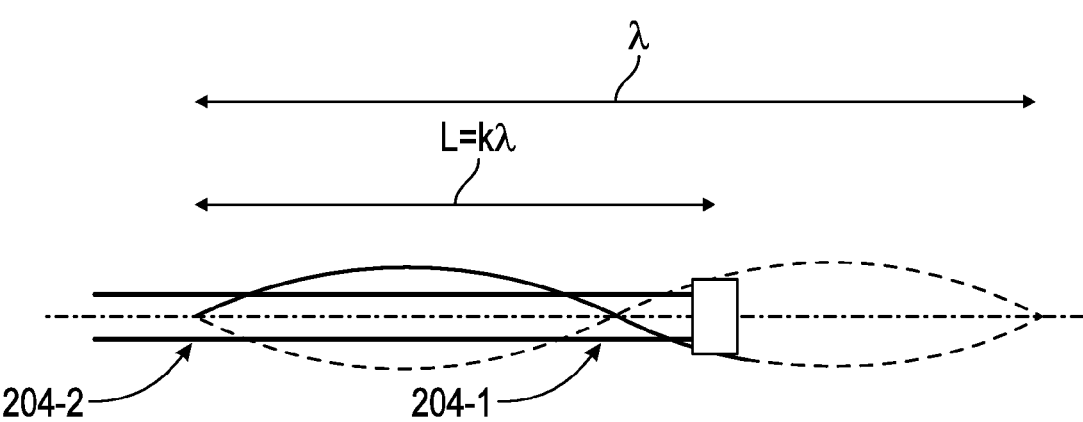
FIG. 6 is a schematic illustration of a lower portion of a BHA showing HFTO displacement amplitude variation along the BHA, according to an aspect of the present disclosure.

FIG. 6 is a schematic view of a lower BHA showing the HFTO displacement amplitude variation along the BHA. The k varies only slightly across systems and the drill bit is neither a node nor an antinode. In FIG. 6, with the k fixed, the fundamental frequency of the systems can be considered so the following equation can be applied:

$$f = \frac{kv}{L} \tag{3}$$

where L is the distance between the bit and the first significant node (the second node 204 from the bit which is node 204-2 in this case) and k is a constant between 0.5 and 1.0. From the wavelength (λ) can further be defined as:

$$\lambda = \frac{L}{k} \tag{4}$$

which characterizes the system based on a classification of three types of HFTO, as described below.

Figure 7:
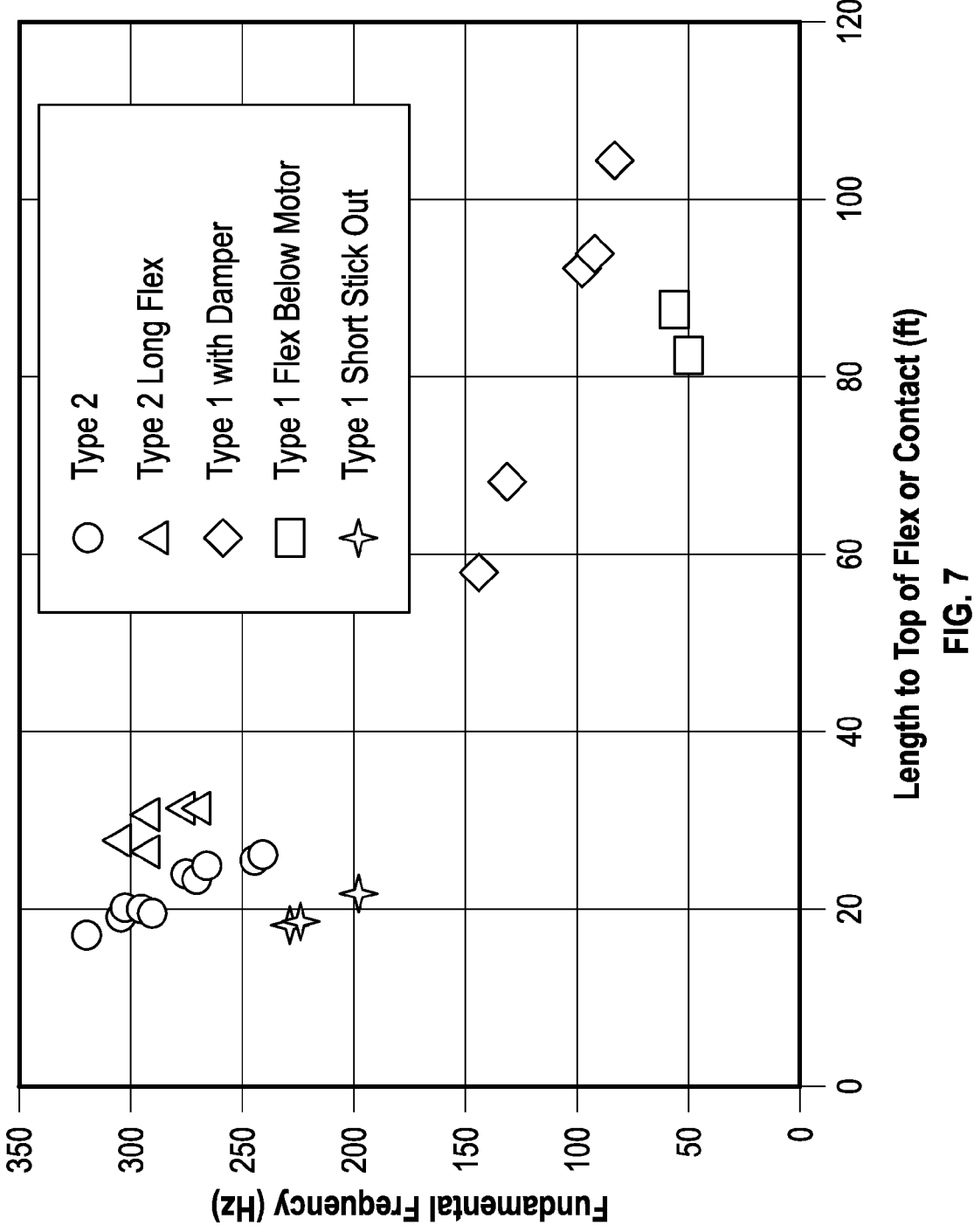
FIG. 7 is a plot of HFTO frequency against length for different BHA runs, and classified according to BHA type, according to an aspect of the present disclosure.

In FIG. 7 the frequency-to-length relation is shown for different BHA systems. The frequency is the first peak in the HFTO spectrum while the length is defined by a distance from a reference location on the drilling tool (such as the end of the drill bit) to the first significant node of the HFTO. For example, the length can be defined by a distance from a reference location on the drilling tool (such as the end of the drill bit) to the top of the flex joint, the top of the first large diameter tool above the rotary steerable tool (for Type 2 HFTO), or to the bottom of the motor (for Type 1 HFTO).

Figure 8:
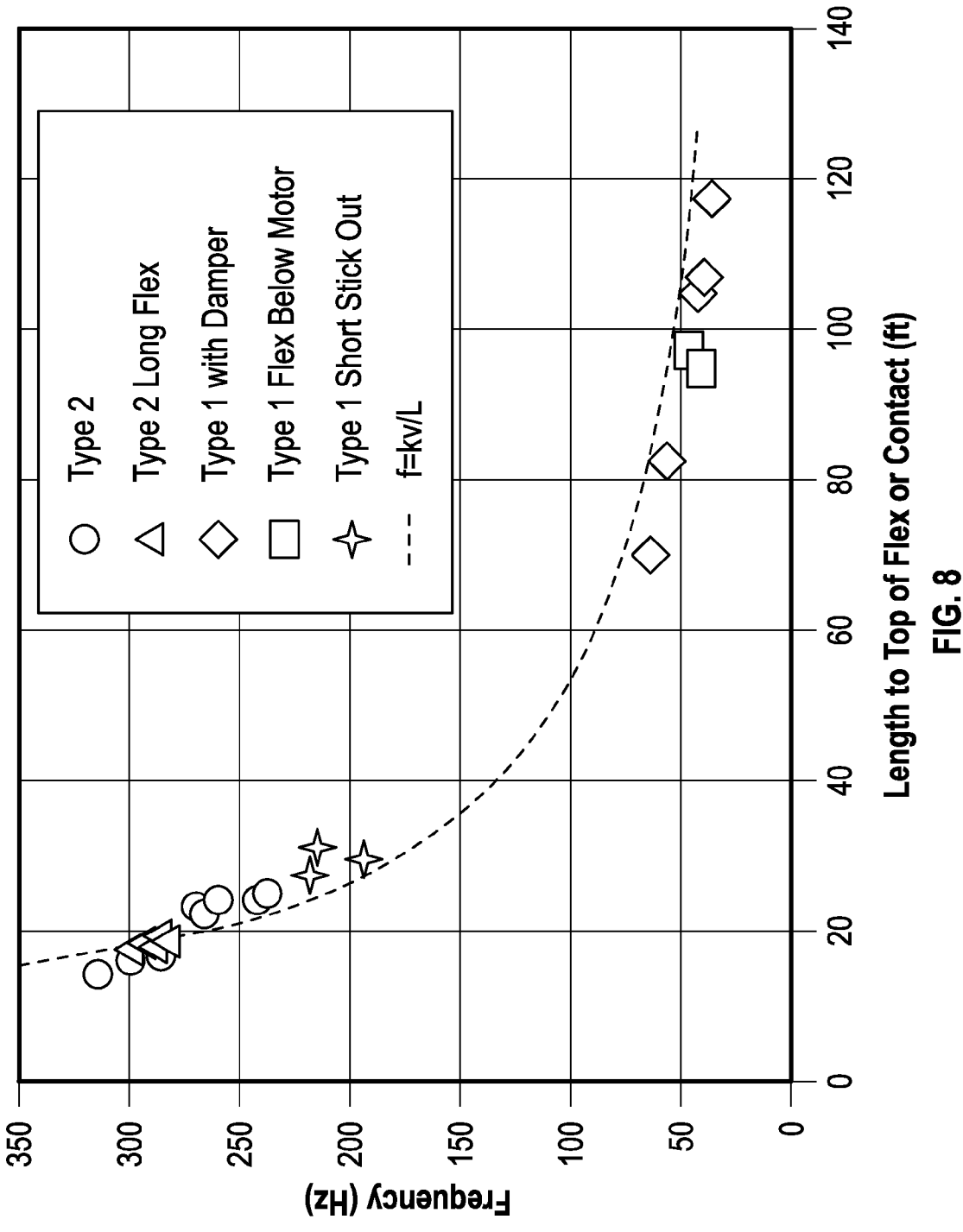
FIG. 8 is a plot of HFTO frequency plotted against characteristic length for the runs of FIG. 7, with a transform described in relation to Table 2, according to an aspect of the present disclosure.

As shown, the experimental data falls into distinct clusters, and taking each group the HFTO can be classified and a criterion developed to resolve if this is the fundamental or harmonic as well as to characterize the length to the first significant node of the HFTO. This transposition is described in detail below and summarized in Table 2. The resulting data is shown in FIG. 8. The experimental data of FIG. 8 can be correlated to equation 3 to provide a computational model that includes a linear function that relates characteristic frequency f for the different HFTO vibration types to a length L representing distance from a reference location on the drilling tool (such as the end of the drill bit) to the first significant node of the HFTO vibration. Note that the correlation of the experimental data of FIG. 8 to equation 3 is excellent giving significance in use of the model. For the model illustrated by the dotted line in FIG. 8, kv=6,000 ft/s (1825 m/s).

TABLE 2

| Transposition | |
| --- | --- |
| Type 2 | No change |
| Type 2 long flex | Length from bit to mid-point in flex |
| Type 1 long assembly | Length from bit to 40% up motor, frequency is first harmonic, so frequency halved to show fundamental |
| Type 1 flex below motor | Length from bit to 40% up motor |
| Type 1 short stick out | Length from bit to 40% up motor |

In the embodiments described herein, Type 1 HFTO is the classically considered HFTO for a motor driven rotary steerable system (RSS), which sees resonance of the stick out below the motor. It is presumed that the torsional waves are decoupled at the motor, forming a reflection. This is shown schematically in FIG. 9.

Figure 10A:
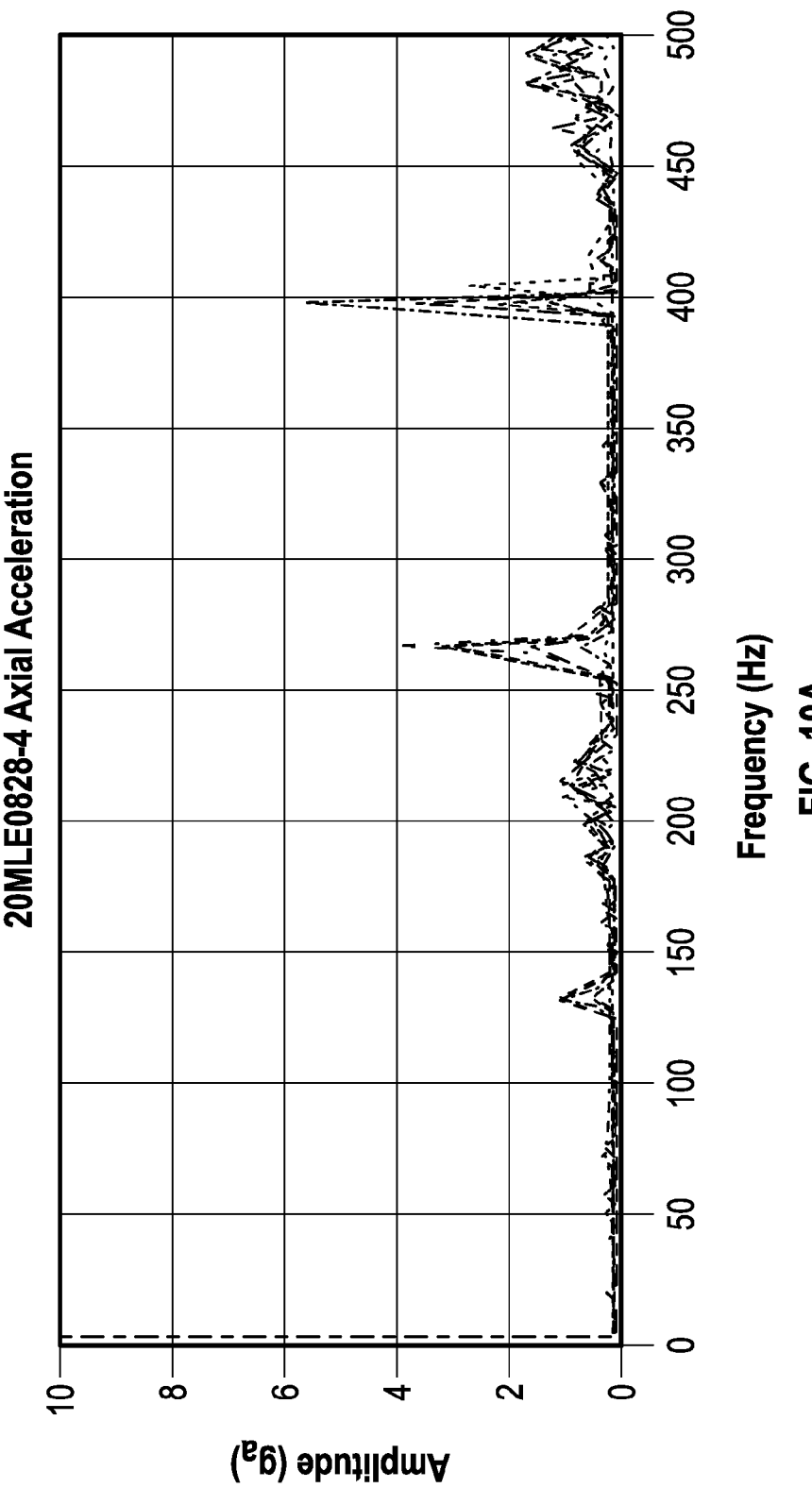
FIGS. 10A, 10B and 10C are plots of the Fast-Fourier-Transform (FFT) of axial acceleration, lateral acceleration, and internal collar pressure, respectively, from a drilling dynamics sensor tool on a slim BHA with an MWD below a motor, according to an aspect of the present disclosure.
Figure 10B:
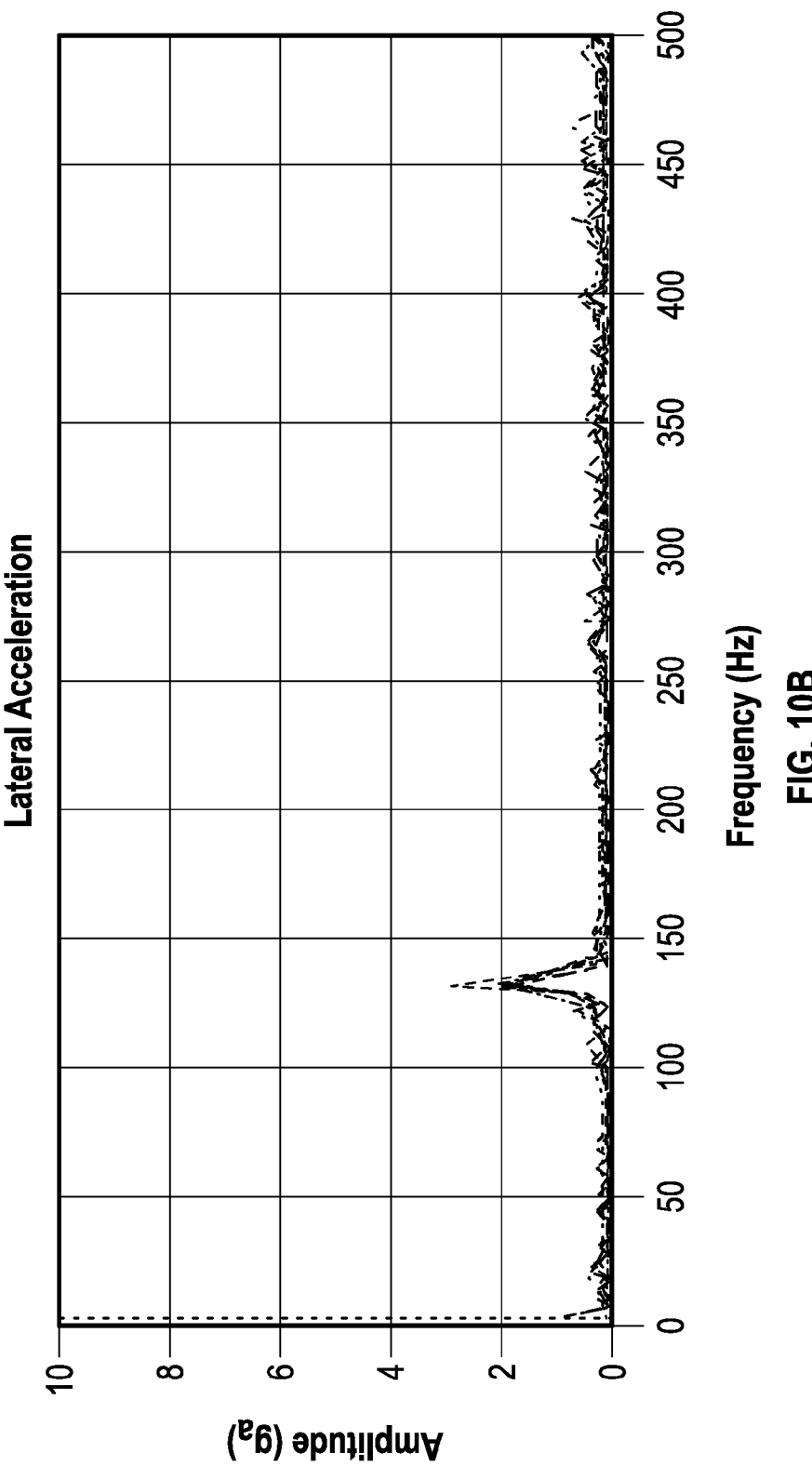
Figure 10C:
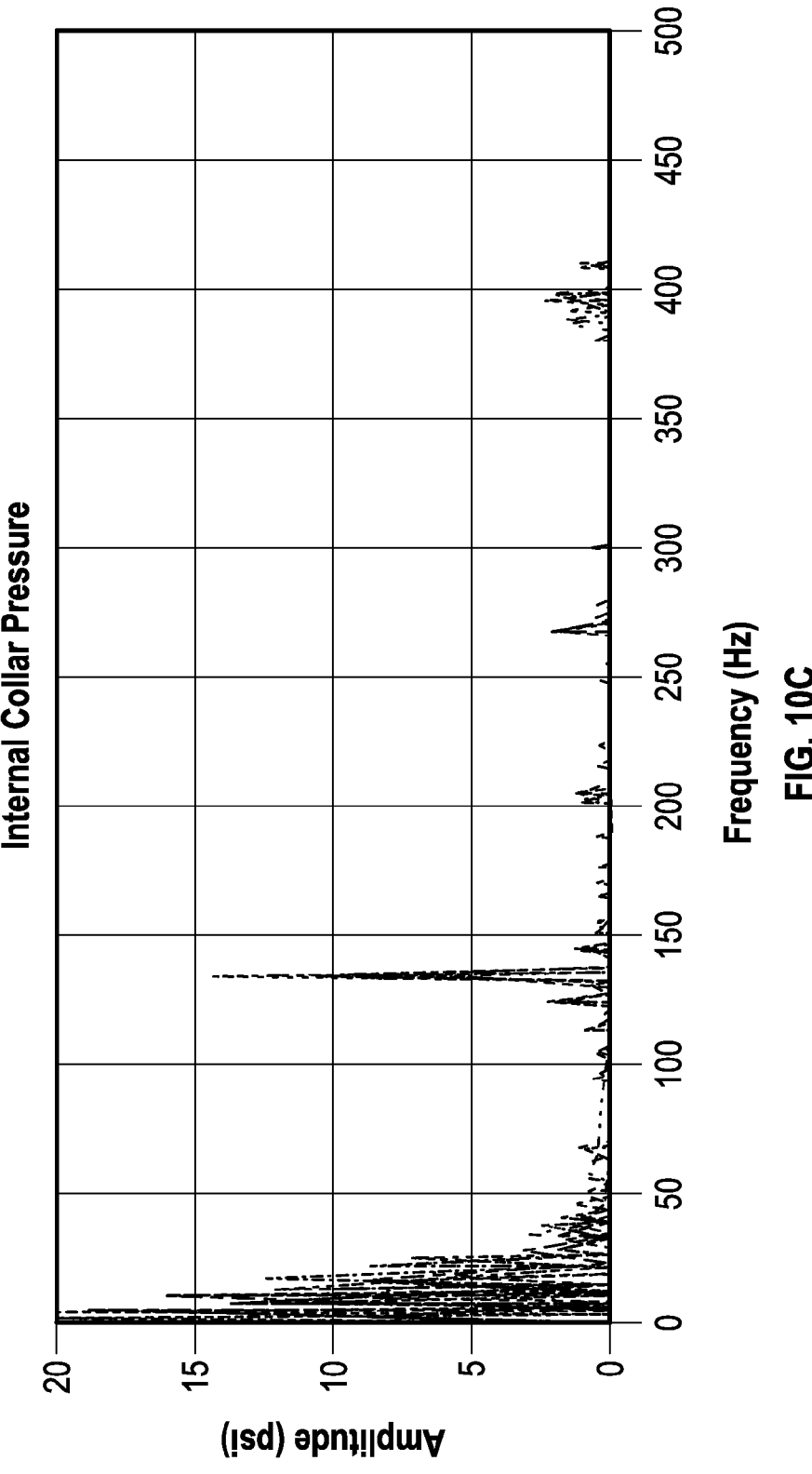

To test the hypothesis of total reflection at the motor, dynamics data from an XBOLT tool in two tests is shown in FIGS. 10A to 10C and 11A to 11C. In FIGS. 10A to 10C, the MWD tool (with vibration sensors) was below the motor and we see the HFTO dynamics on both accelerometer axes as well as the internal collar pressure. The dynamics are coupling from the torsional frame into the hydraulic channel at the motor. Of note, the indication of HFTO frequency perturbations in the fluid is an indicator of torsional vibration at the motor and can be used in the classification of Type 1 HFTO.

Figure 11A:
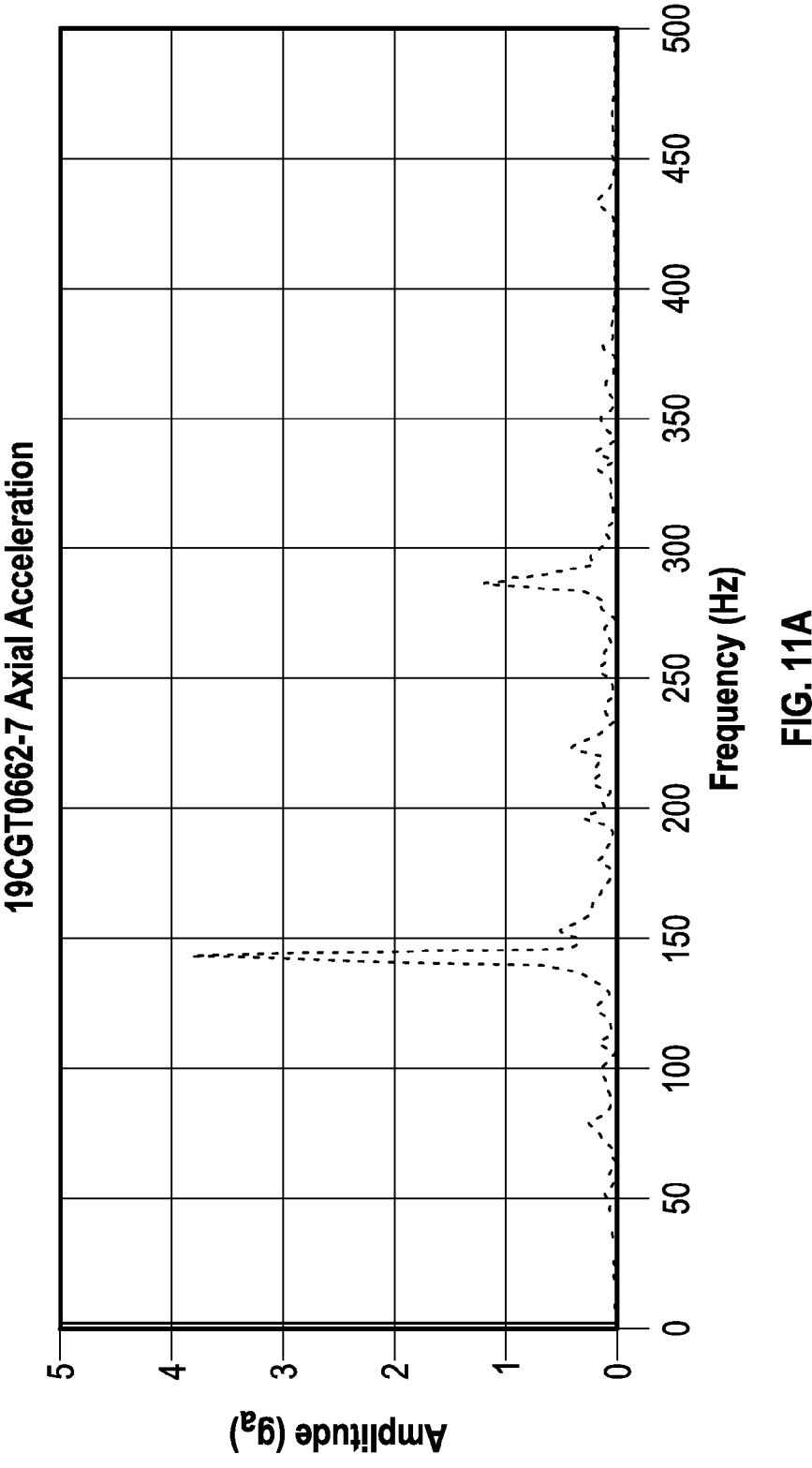
FIGS. 11A, 11B and 11C are plots of the Fast-Fourier-Transform (FFT) of axial acceleration, lateral acceleration, and internal collar pressure, respectively, from a drilling dynamics sensor tool above the motor, according to an aspect of the present disclosure.
Figure 11B:
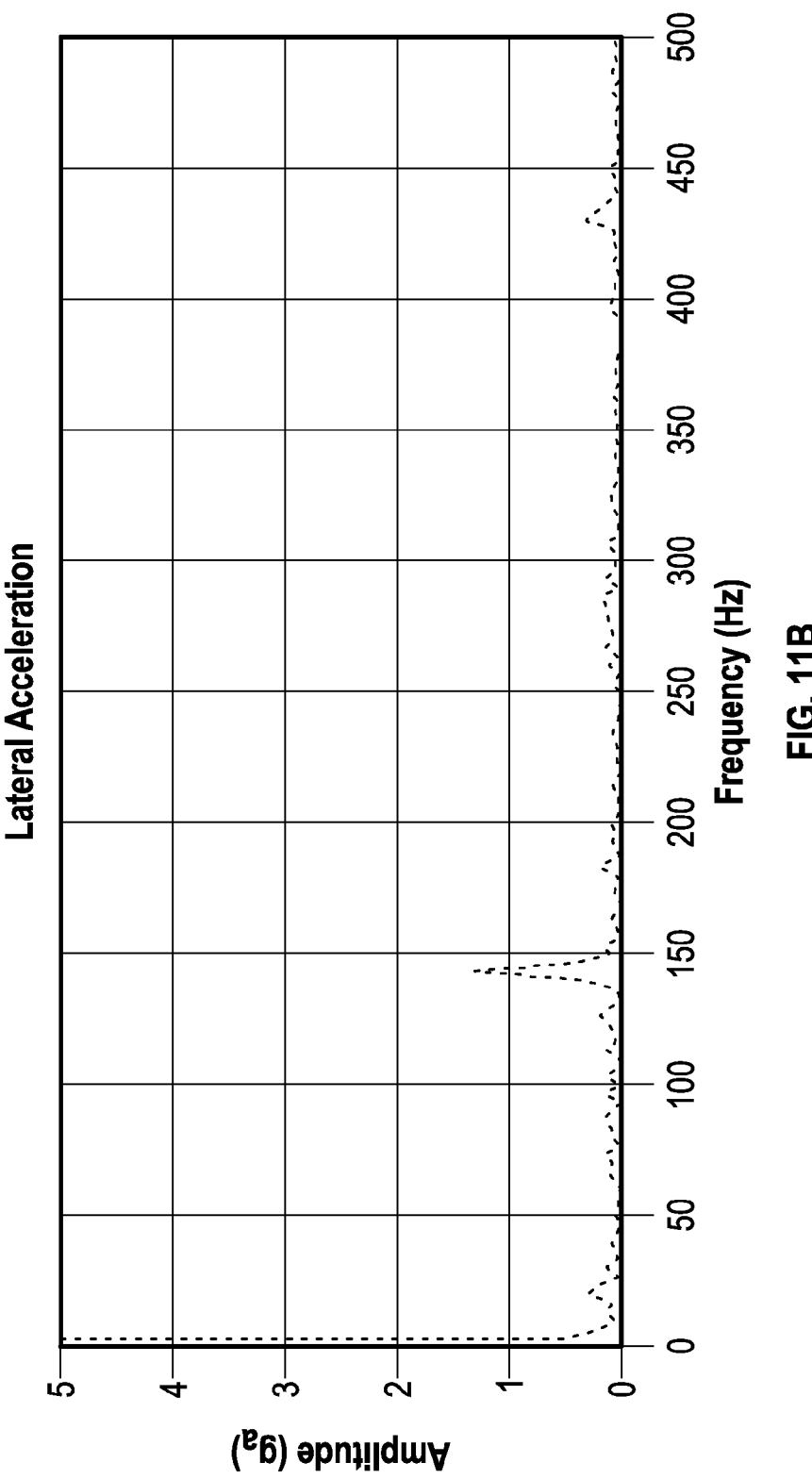
Figure 11C:
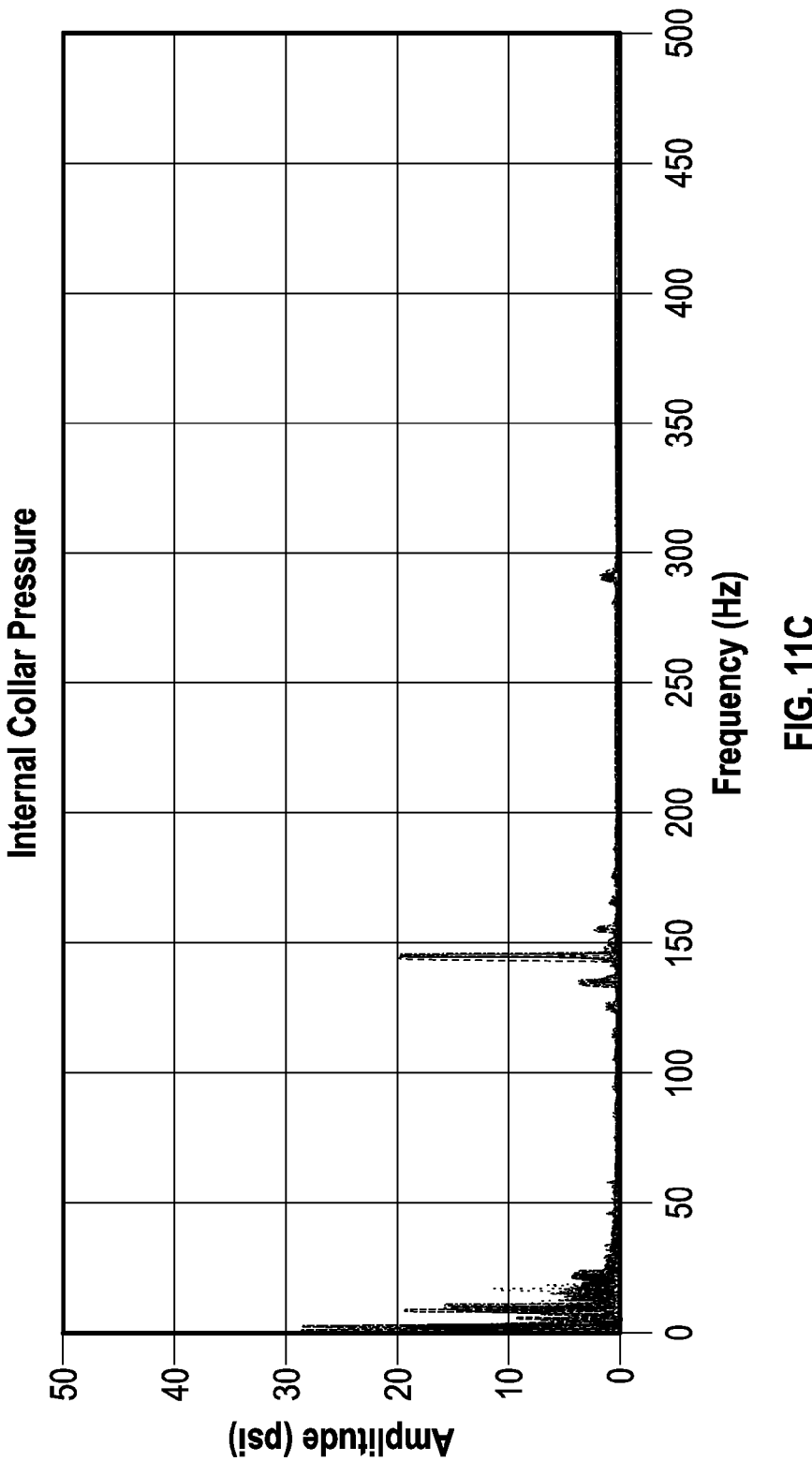

In the test of FIGS. 11A to 11C, the MWD tool (with vibration sensors) was mounted above the motor. In this data, the HFTO is seen in the axial and the lateral axes as well as in the hydraulic channel. The axial as well as the torsional vibration is transmitted through the motor into the collar. The pressure perturbation above the motor is also detected, and the relative amplitudes of the pressure above and below the motor clearly depend on the acoustic channel geometry.

In view of the disclosure herein, it is evident to one of ordinary skill in the art that the actual boundary condition at the motor may not be a simple reflection. Unfortunately, conventional modelling can ramp the torque down linearly along the rotor, and/or suggests that the drive shaft will decouple everything further up the string.

Looking at the data for the short stick out scenario as shown in FIG. 7, by placing the node 0.4 $L_m$, where $L_m$ is the length of the motor up from the bottom of the tool, we can see good consistency with the frequency of the other data. This provides a simple but robust approximation.

Two other groups of data for the Type 1 HFTO are also seen, and both have a long stickout with the MWD below the motor. The two cases with a lower frequency (shown as the cluster near 80 ft. (24 m) and 50 Hz) have a flex joint directly below the motor. These map almost directly on the line in FIG. 4, showing consistency with the other HFTO cases.

The other cases had a conventional damper, and the position of the dampers varied from 68 ft. (21 m) to over 80 ft. (24 m). Considering this group, the likely scenario is that the fundamental HFTO is not seen, but instead we see the first harmonic. By dividing this frequency in half, we can see the fundamental frequency shown in FIG. 8. The collapse of the data thus appears very good and the simple model appears robust and reliable.

The discussion with respect to Type 1 HFTO considers HFTO with oscillation in the entire section between the bit and the motor, the latter forming the discontinuity and the node in the system. However, many scenarios of HFTO are more complex and we can see HFTO in BHAs that do not have a drilling motor as well as BHAs that experience multiple HFTO frequencies.

Figure 12A:
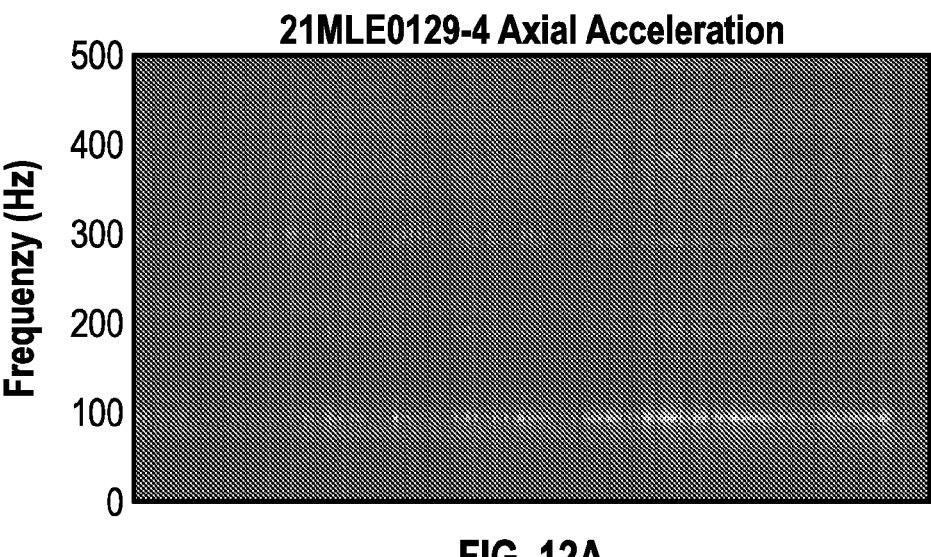
FIGS. 12A and 12B are sonograms of axial acceleration and internal pressure, respectively, measured with a drilling dynamics sensor, according to an aspect of the present disclosure.
Figure 12B:
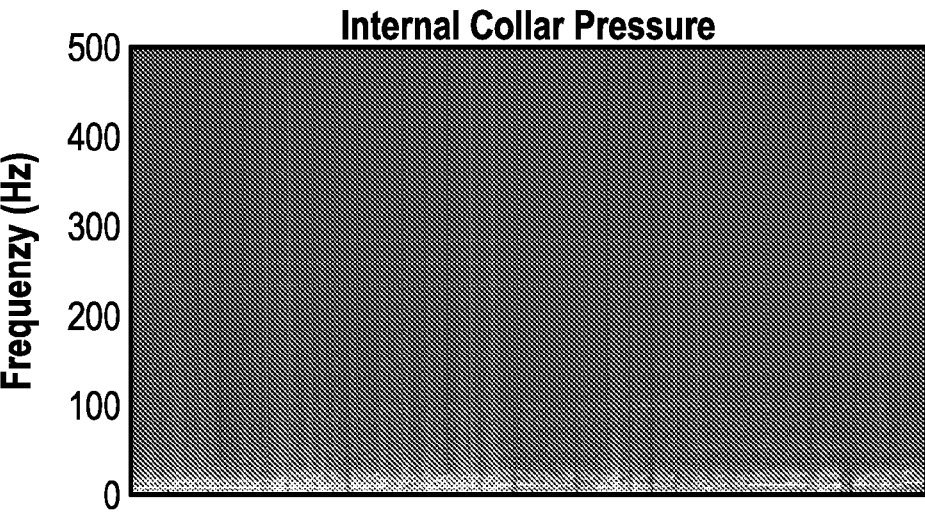
Figure 12C:
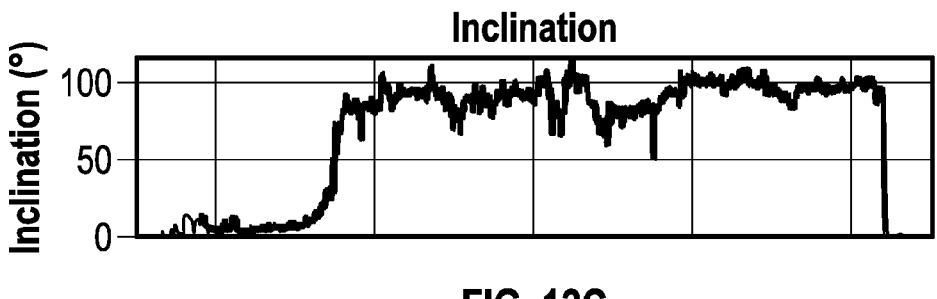
FIG. 12C is a plot of inclination measured with the drilling dynamics sensor of FIGS. 12A and 12B, according to an aspect of the present disclosure.
Figure 13A:
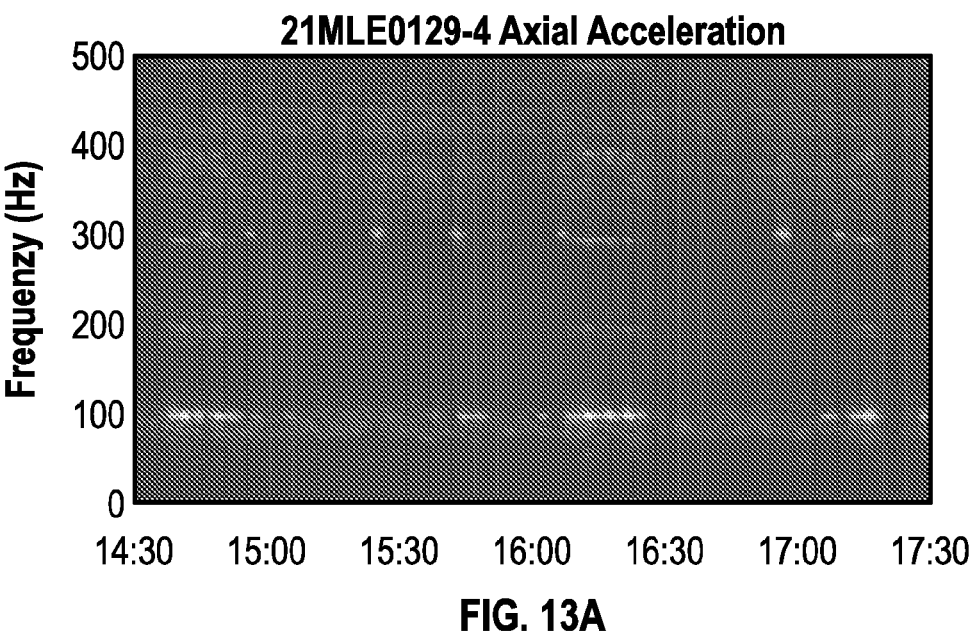
FIGS. 13A and 13B are expanded scale parts of the sonograms of axial acceleration and internal pressure of FIGS. 12A and 12B, respectively, according to an aspect of the present disclosure.
Figure 13B:
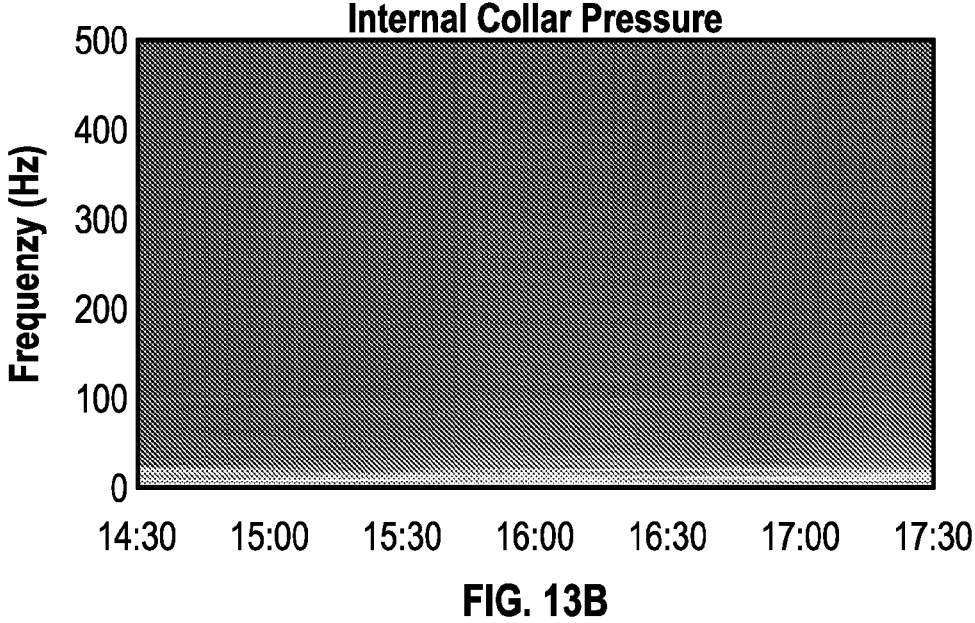
Figure 13C:
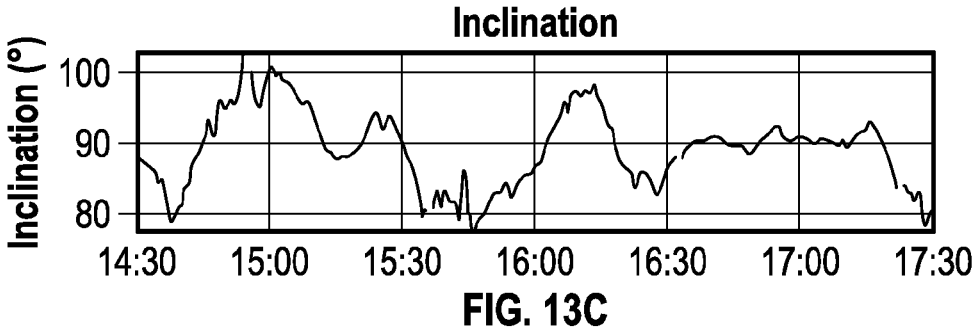
FIG. 13C is an expanded scale part of the plot of inclination of FIG. 12C, according to an aspect of the present disclosure.

FIGS. 12A and 12B shows the sonograms for axial acceleration and internal collar pressure for a BHA run, and the same data is shown in FIGS. 13A and 13B on an expanded timescale. At first glance we have Type 1 HFTO at about 98 Hz (we only have 3.33 Hz resolution) with harmonics at about 196 Hz, 294 Hz, and 390 Hz. This appears in the pressure channel. FIG. 12C shows the inclination for the BHA run of FIGS. 12A and 12B, and the same data is shown in FIG. 13C on an expanded timescale.

Figure 9:
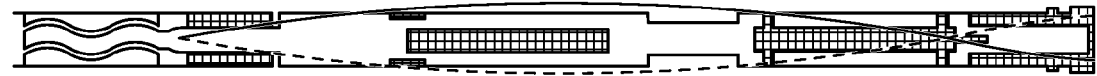
FIG. 9 is a schematic illustration of a BHA with a motor, MWD, flex joint, and rotary steerable tool, with HFTO displacement for Type 1 HFTO, according to an aspect of the present disclosure.

However, looking more carefully we see that there is a second frequency at about 302 Hz. This is not appearing in the pressure channel and is mutually exclusive from the 98 Hz frequency. The classification of these types of HFT is new, and for clarity we classify this higher frequency vibration as Type 2 HFTO. FIG. 9 illustrates a schematic of a BHA with a motor, MWD, flex joint, rotary steerable tool, and HFTO displacement for Type 2 HFTO.

Figure 14:
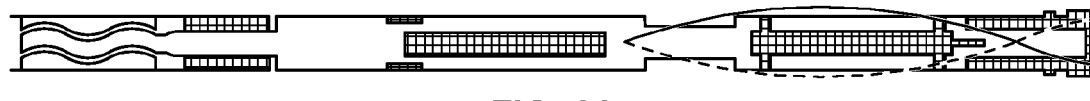
FIG. 14 is a schematic illustration of a BHA with a motor, MWD, flex joint, and rotary steerable tool, with HFTO displacement for Type 2 HFTO, according to an aspect of the present disclosure.

With the higher frequency, Type 2 HFTO has a much shorter wavelength and by not appearing in the pressure channel it appears to be localized in the lower BHA with minimal energy reaching the drilling motor. As shown schematically in FIG. 14. We see this type of HFTO in many assemblies both with and without a motor, although it appears more commonly in BHAs with higher dogleg severity (DLS) capability. The clusters of data in FIGS. 7 and 8 include systems in all these categories with bit size from 6⅛ in. (15.5 cm) to 8¾ in. (22.2 cm).

From FIGS. 7 and 8, it is seen that the frequency correlates with the distance from the bit to the first contact point above the rotary steerable tool. In many assemblies this is the top of the flex joint above the steering tool. These cases are shown in FIGS. 7 and 8. In at least one application of a high DLS tool, if a long flex (e.g., at least 13 ft. (4 m) is used, there appears to be additional contact in the center of the flex. This contact acts as the node. By applying the correction to this contact point, the data in FIGS. 7 and 8 can be transposed to show it correlates with the model.

Figure 15A:
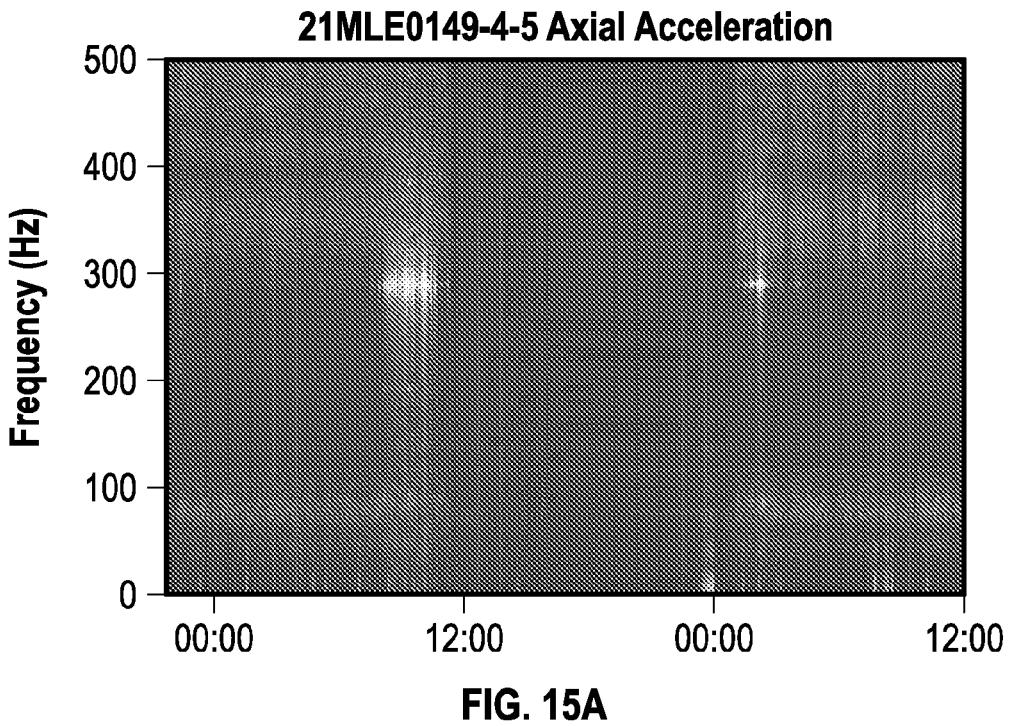
FIG. 15A is a sonogram of axial acceleration over time for two BHA runs with an amplitude of the vibration at 290 Hz, according to an aspect of the present disclosure.
Figure 15B:
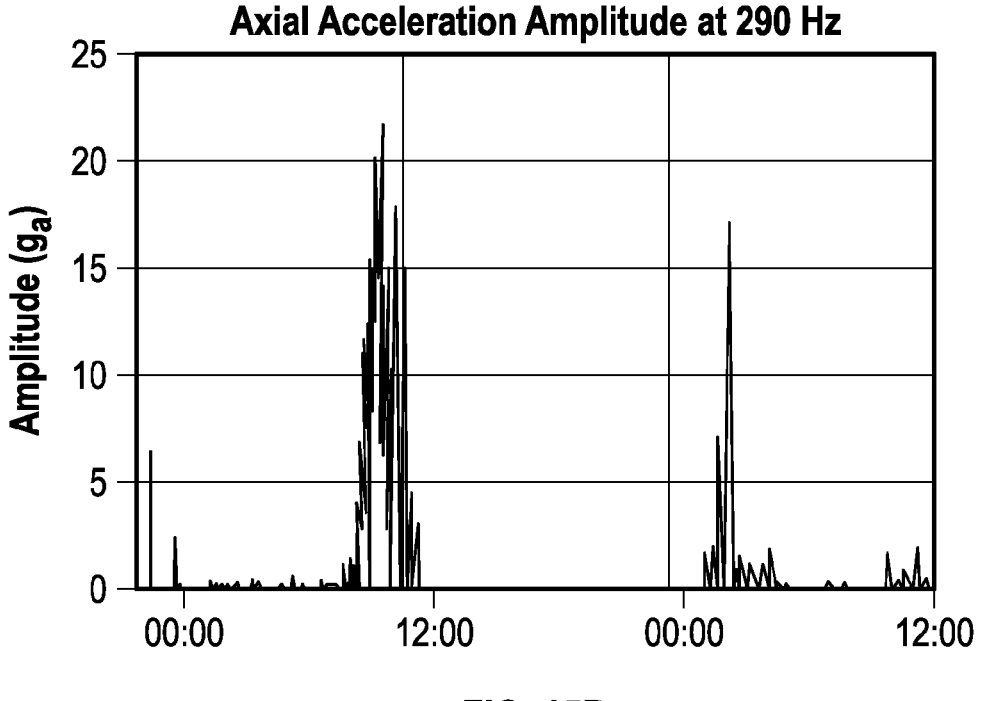
FIG. 15B is a plot of the amplitude of axial acceleration over time for the two BHA runs of FIG. 15A, according to an aspect of the present disclosure.

The data in FIGS. 15A and 15B can be considered in the context of the impact of the wellbore trajectory on Type 2 HFTO. These figures are from two sequential runs in the same section of a wellbore. The first of those runs was terminated due to a failure in a component of the rotary steerable, which is a typical HFTO-related failure. From these figures, it is seen that the HFTO starts and increases in magnitude very quickly. The frequency is about 290 Hz which correlates to a touch point on the top of the flex joint. Interestingly the HFTO was triggered just before the end of the first run, resulting in the failure, and it restarts immediately as the BHA of the second run starts to drill, and then quickly degrades. This would imply that this HFTO is driven by the wellbore profile, which is common across both runs.

Figure 16A:
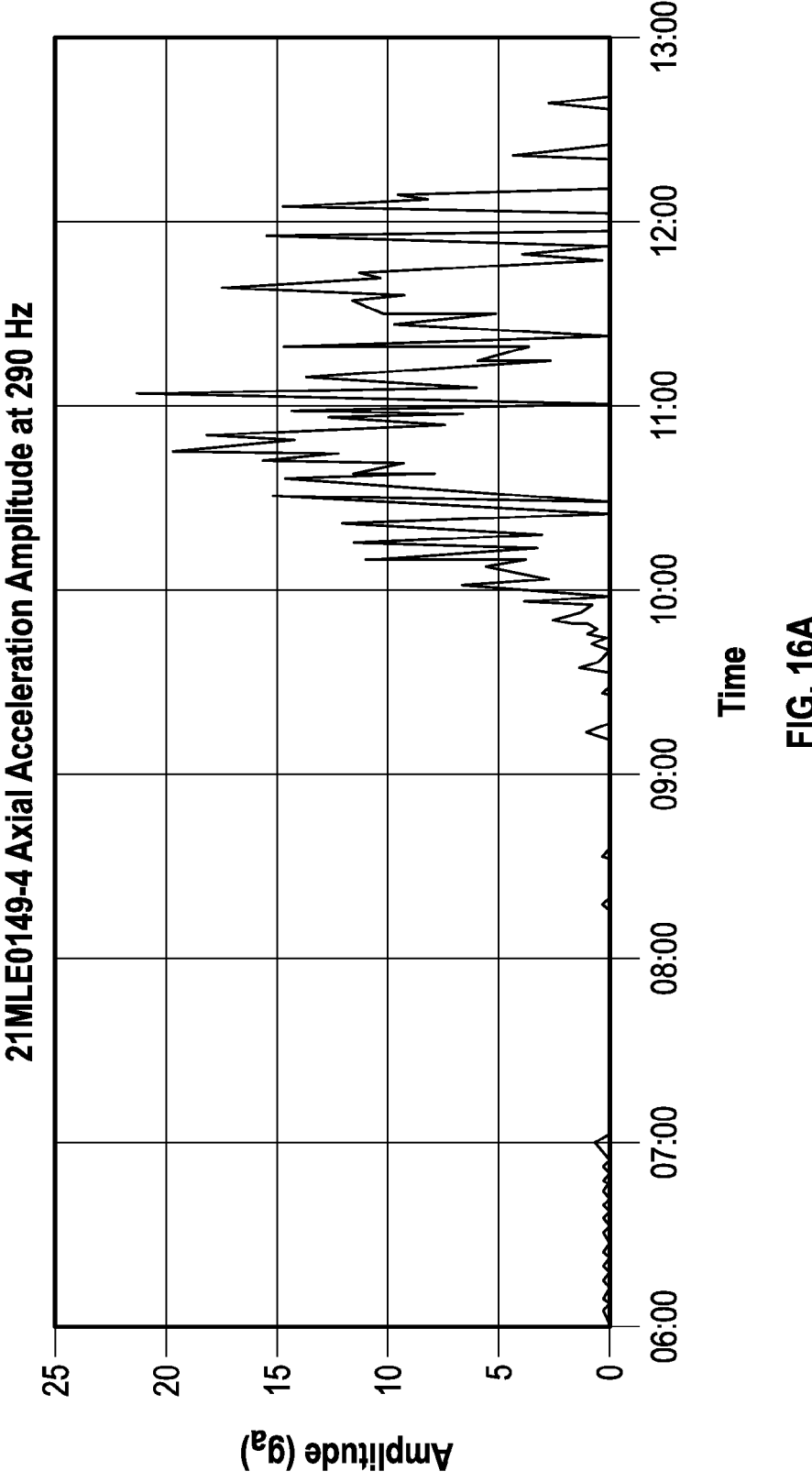
FIG. 16A is a plot of the amplitude of axial vibration at 290 Hz over time from the first run of the plot of FIG. 15B, according to an aspect of the present disclosure.
Figure 16B:
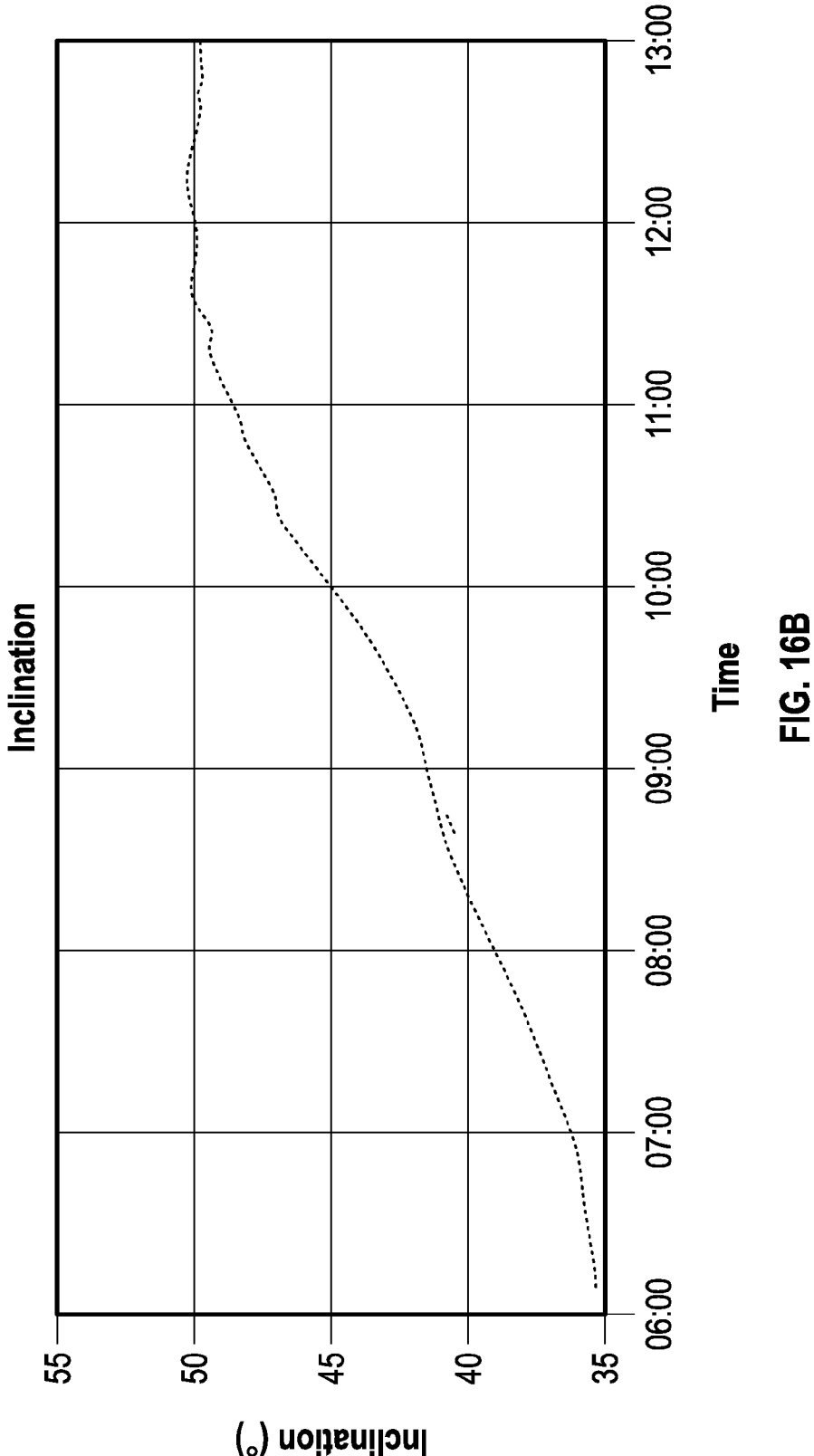
FIGS. 16B and 16C are plots of continuous inclination and temporal differential over time corresponding to the plot of axial vibration of FIG. 16A, according to an aspect of the present disclosure.
Figure 16C:
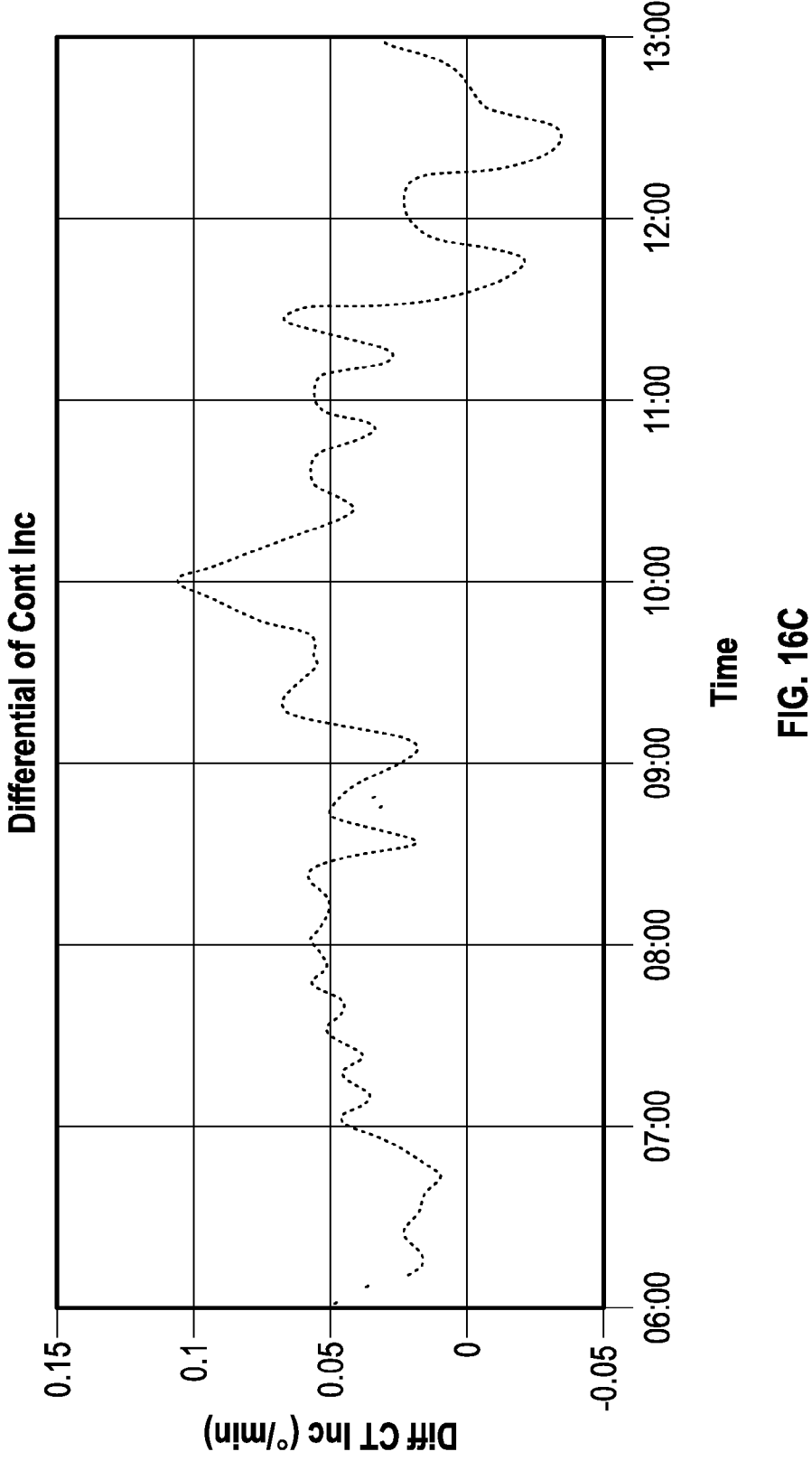

In FIGS. 16A, 16B and 16C, the amplitude of the HFTO is also shown, from the axial acceleration, together with the continuous inclination and its temporal derivative. This shows that the HFTO is triggered as the wellbore is kinked upwards. The well was being drilled at a constant ROP and the 0.1°/min represents a DLS of 12°/100 ft. (12°/30 m). This could correlate to the bit hitting a hard stringer which kinked the well and increased the side force on the contact point and triggered the HFTO. This explains the anecdotal observation that heterogenous formations tend to have worse HFTO than homogeneous formations.

Figure 17A:
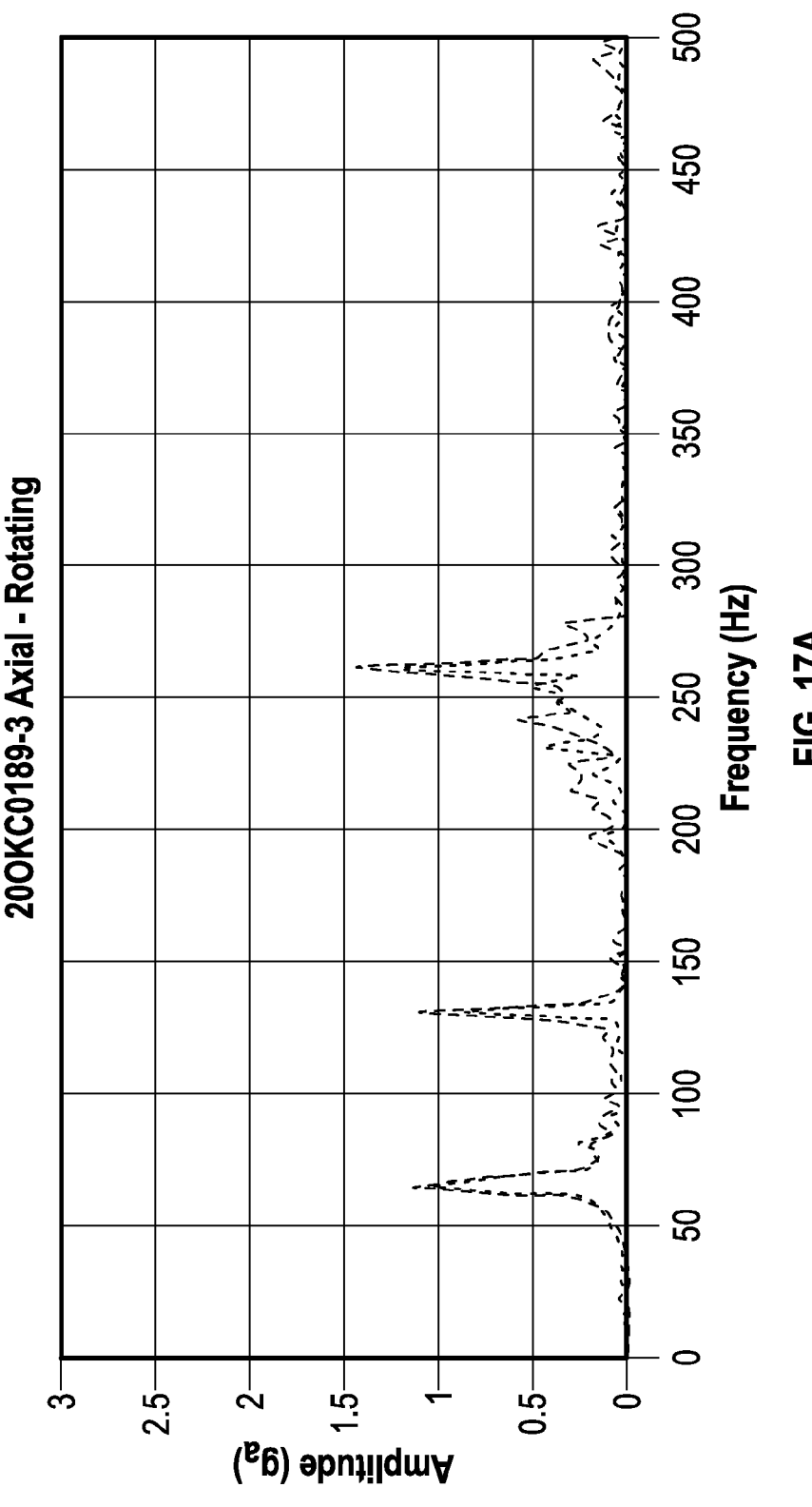
FIGS. 17A and 17B are plots of the Fast-Fourier-Transform (FFT) of axial acceleration from a run of a BHA with a steerable motor for a period while rotating and a period while sliding, respectively, according to an aspect of the present disclosure.
Figure 17B:
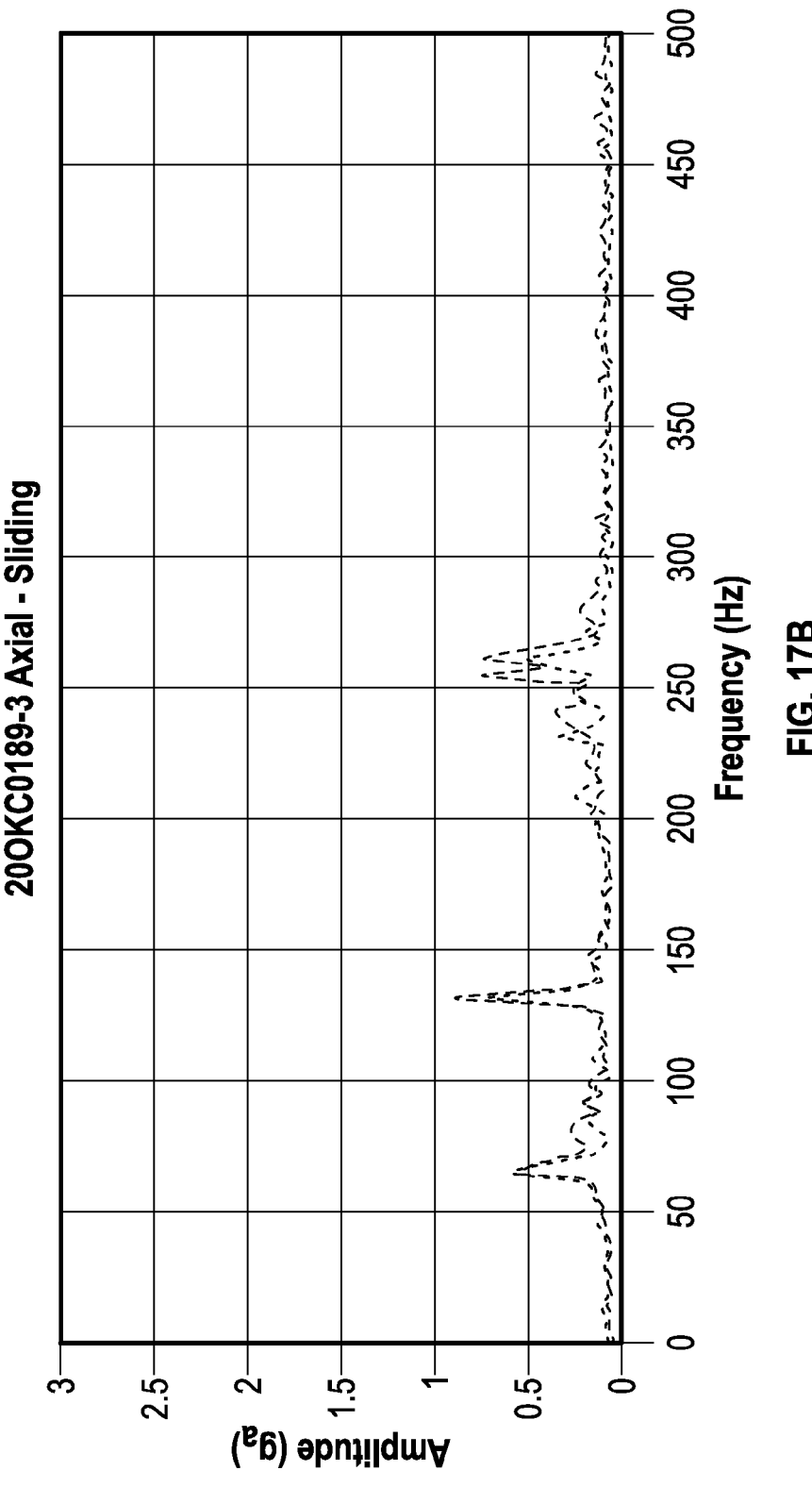
Figure 17C:
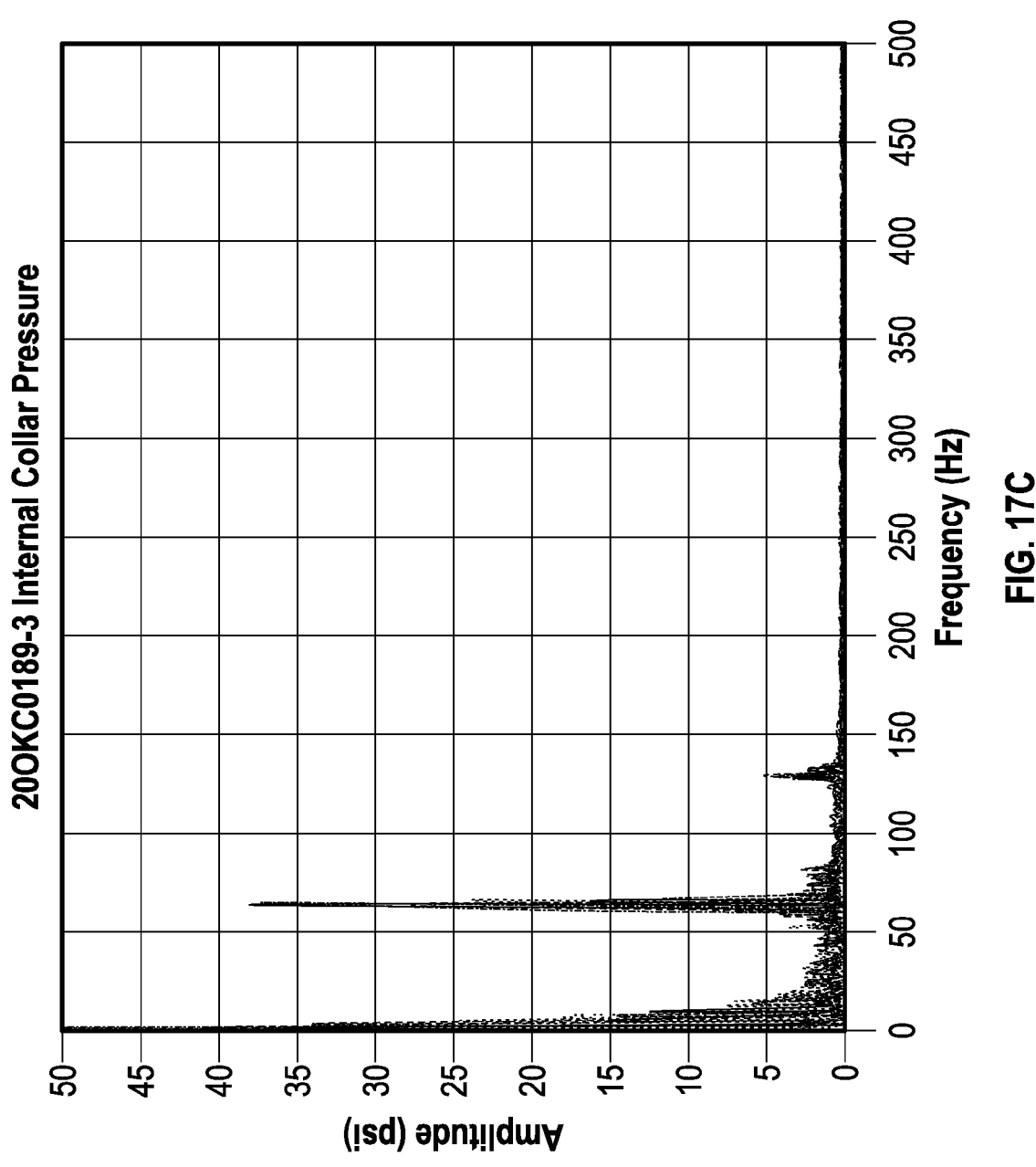
FIG. 17C is a plot of the Fast-Fourier-Transform (FFT) of internal collar pressure of a BHA run with a steerable motor, according to an aspect of the present disclosure.

Traditionally, HFTO has been considered an issue with long, rotary-steerable type assemblies. However, the same characteristics can be observed in steerable motor systems. FIGS. 17A to 17C show data from a run which used a steerable motor rather than a rotary steerable tool. Here there is just the bit below the motor and the run was terminated due to buckling failure in a battery.

We see very clear indications of HFTO-type signatures in the axial acceleration channels, as well as in the internal collar pressure. Of note, the lateral accelerations also show the signatures, but are not presented here. The oscillation in pressure is significantly larger than in Type 1 HFTO, which is a relevant consideration in the process. The perturbations in the bit torque couple through the motor and into the collar as well as into the pressure perturbations. These pressure perturbations drive the weight on bit and hence torque oscillations. As such, HFTO is generated in the motor collar even while sliding. This HFTO can be considered a third type of HFTO (Type 3 HFTO).

For mitigation measures, different types of dampers are available, with some being more effective than others. For instance, tools from Tomax AS of Stavanger, Norway and Scout Downhole of Conroe, Texas are similar in design and use upper and lower sections joined by a thread. As the drilling torque increases, the tool length will reduce and the weight on bit will drop. Springs are also used to transmit compressive load across the joint to prevent the joint from moving against the limits of the thread.

The tools are around 17 ft. (5 m) in length so they are not placed below the MWD tool in a slimhole operation. Instead, they are placed between the MWD and the motor. As such they can be effective against Type 1 HFTO, but they are significantly less effective with Type 2 HFTO as the higher frequency waves are confined to the near bit region below the motor. The tool of Tomax AS was originally developed as a stick/slip mitigation tool but has now found a market in HFTO mitigation.

The Sentinal tool available from SLB of Sugar Land, Texas uses annular elements mounted inside the tool filled with high viscous fluid to dampen the oscillation. The tool can be dramatically shorter than those discussed in the preceding paragraph and can be about 7 ft. (2 m) in length and can thus be more readily positioned between the steering tool and the MWD or between the steering tool and the bit. As such, it should be able to mitigate effects of Type 1 HFTO and Type 2 HFTO. In some cases, the tool can be fitted with a wear band to create contact with the wellbore wall and act as a node, as discussed herein.

The WTT SILENCER tool from WWT International located in Houston, Texas is a simple tool that uses a plastic sleeve over a mandrel. The operating principle is that it will act as a non-rotating stabilizer and decouple the collar from the formation, thus mitigating the HFTO.

Figure 18A:
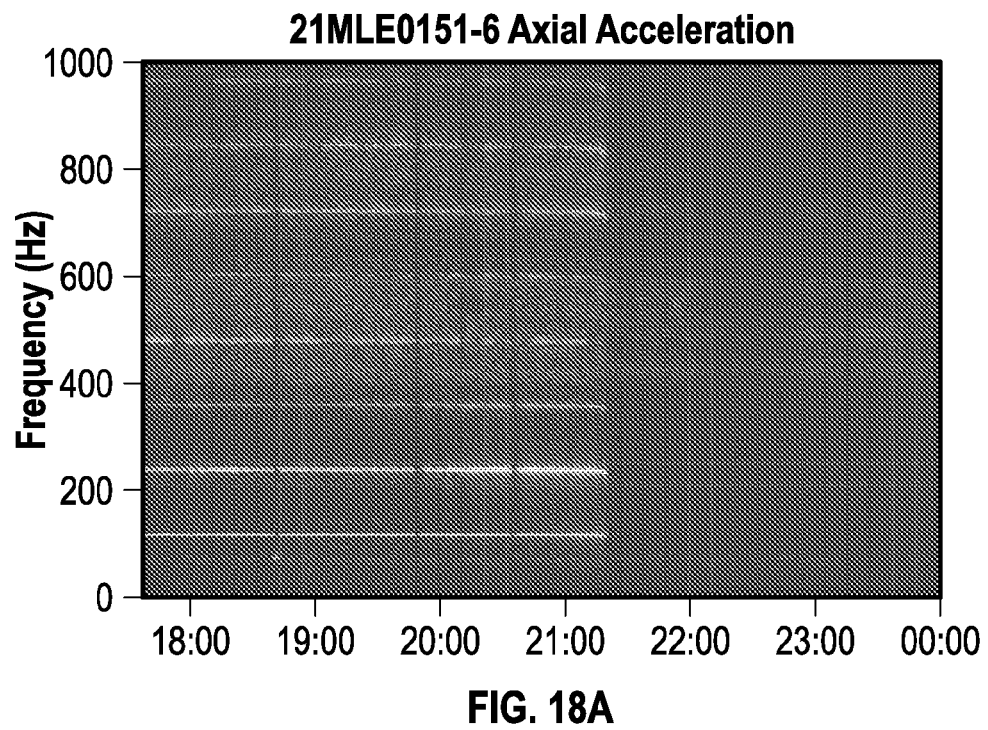
FIGS. 18A and 18B are sonograms of axial acceleration and internal collar pressure, according to an aspect of the present disclosure. The sonogram of axial acceleration of FIG. 18A shows the extent of HFTO, the sonogram of internal collar pressure of FIG. 18B showing initiation of a wash out.
Figure 18B:
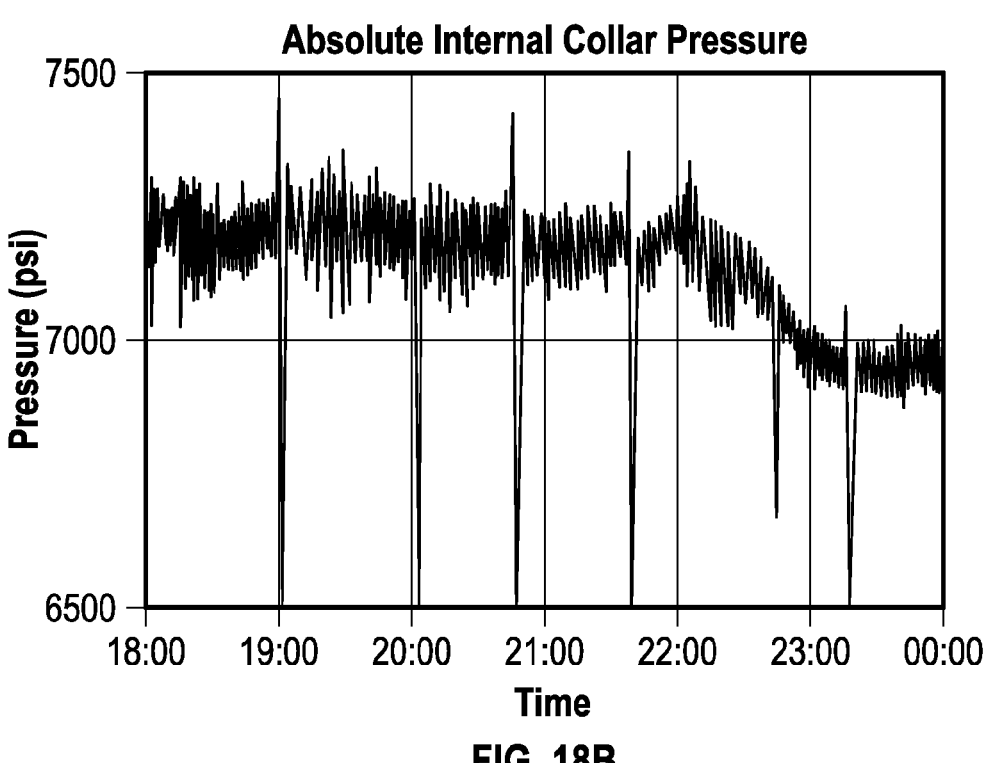

Data from runs of this tool has shown a run which had a washout failure at the RSS. FIGS. 18A and 18B shows sonograms for part of the run. There were very high levels of HFTO seen at the drilling dynamics sensors. This reached a peak at about 21:30, then all of the HFTO stopped instantaneously. There is very clear HFTO at 120 Hz. With the node at the WTT SILENCER tool (80.14 ft. (24.43 m)) and taking this as the first harmonic this plots directly onto the model in FIG. 7. This appears to be a result of the rotating stabilizer that was sticking up to this point and forcing the node to be at this location. When the vibration became very high, the tool was freed and started spinning and the HFTO was mitigated.

Unfortunately, we see from the internal pressure plot at 22:10 that a washout formed and the internal pressure started to drop. Although this was the point where the pressure integrity of the collar failed, the mechanical integrity had been damaged earlier. The resonant frequency starts to drop prior to the failure of the collar. This is especially evident in the higher harmonics. Thus, while this tool has an interesting concept, in this run the implementation was problematic, triggering the HFTO which caused the collar washout.

Analysis of runs using RSS tools showed that the character of the Type 2 HFTO can be dependent upon the contact point above the RSS control unit. In these BHAs it was at a downhole communication tool. If the contact point was a long, slick cylinder, a straight collar or the box of a flex joint, the Type 2 HFTO node would form at this point. In many scenarios downhole communications tools are run with the outside diameter turned down to be flush and fall into this category. If, however, the contact was a shorter (<1 ft. (0.3 m) low friction contact, wear-band for example, the node would be displaced further up the tool to the next contact point. Communication tools with wear bands fall into this category.

By changing the profile of the contact point, the position of the node can be controlled, therefore also controlling the frequency of the HFTO and its damage profile. The upside of this is that by moving the contact point up the BHA, the frequency can be dropped from, in one implementation, about 290 Hz to about 160 Hz, and mitigates the damage to the rotary steerable tool.

Ensuring there is a wear band, stabilizer, or the like at this first contact point is beneficial and can mitigate the very high frequency HFTO which has proved to be damaging to downhole tools. However, the next contact may instead be another sensitive tool, such as an MWD tool. Putting the node (and thus the maximum torsional strain), in this tool can cause the bolts holding the modulator together to back off and cause an MWD tool failure.

To protect the BHA, wear bands may be added to one, two, three, or more points along the BHA. For instance, a wear band can be added to the first two or three contact points, especially protecting key components of an MWD, rotary steerable, or the like. For instance, a gap sub or modulator may be protected.

Figure 19A:
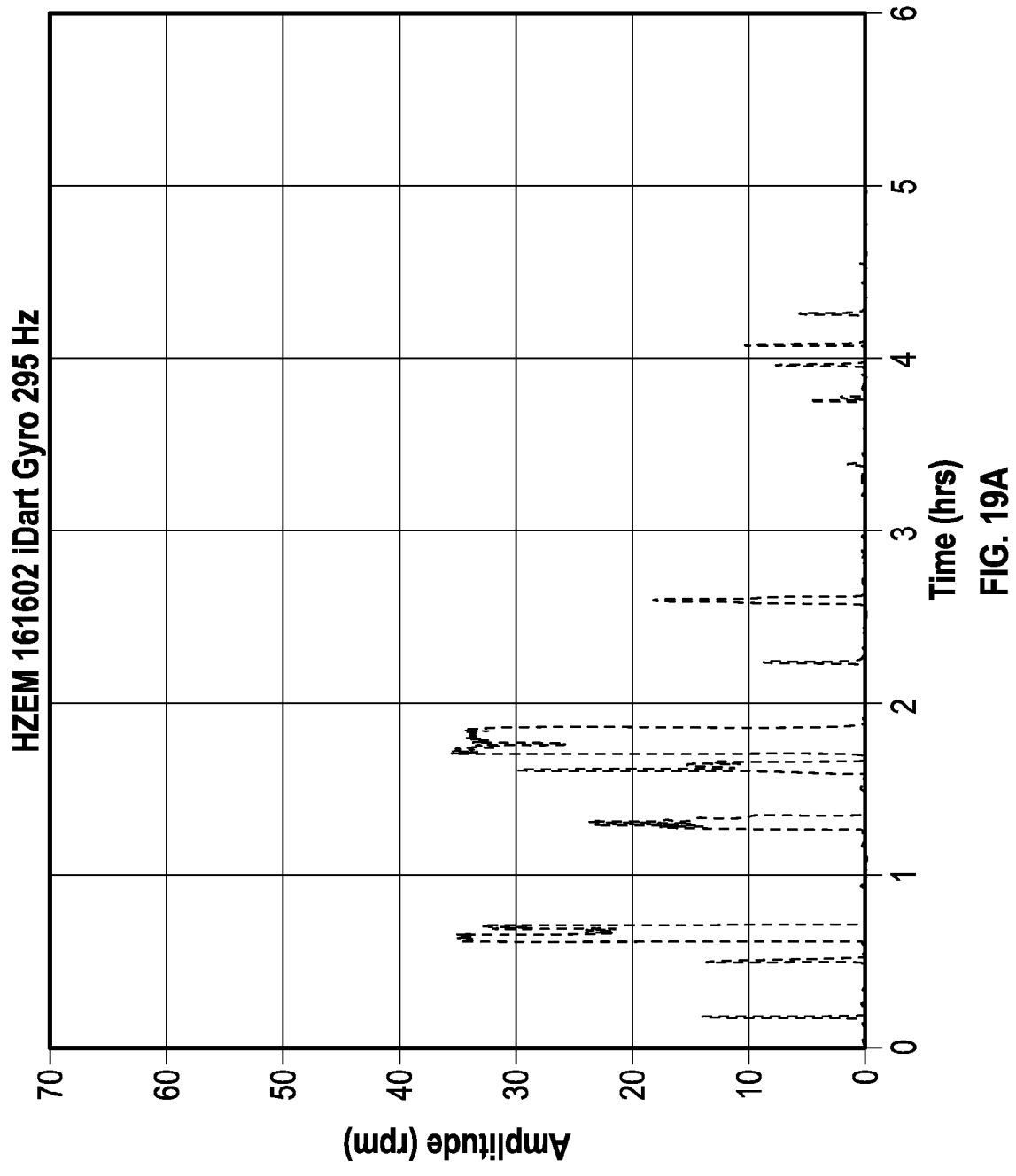
FIGS. 19A, 19B and 19C are plots of the Fast-Fourier-Transform (FFT) of vibrations at HFTO resonance for various offset wells with BHAs having different wear band locations, according to an aspect of the present disclosure.
Figure 19B:
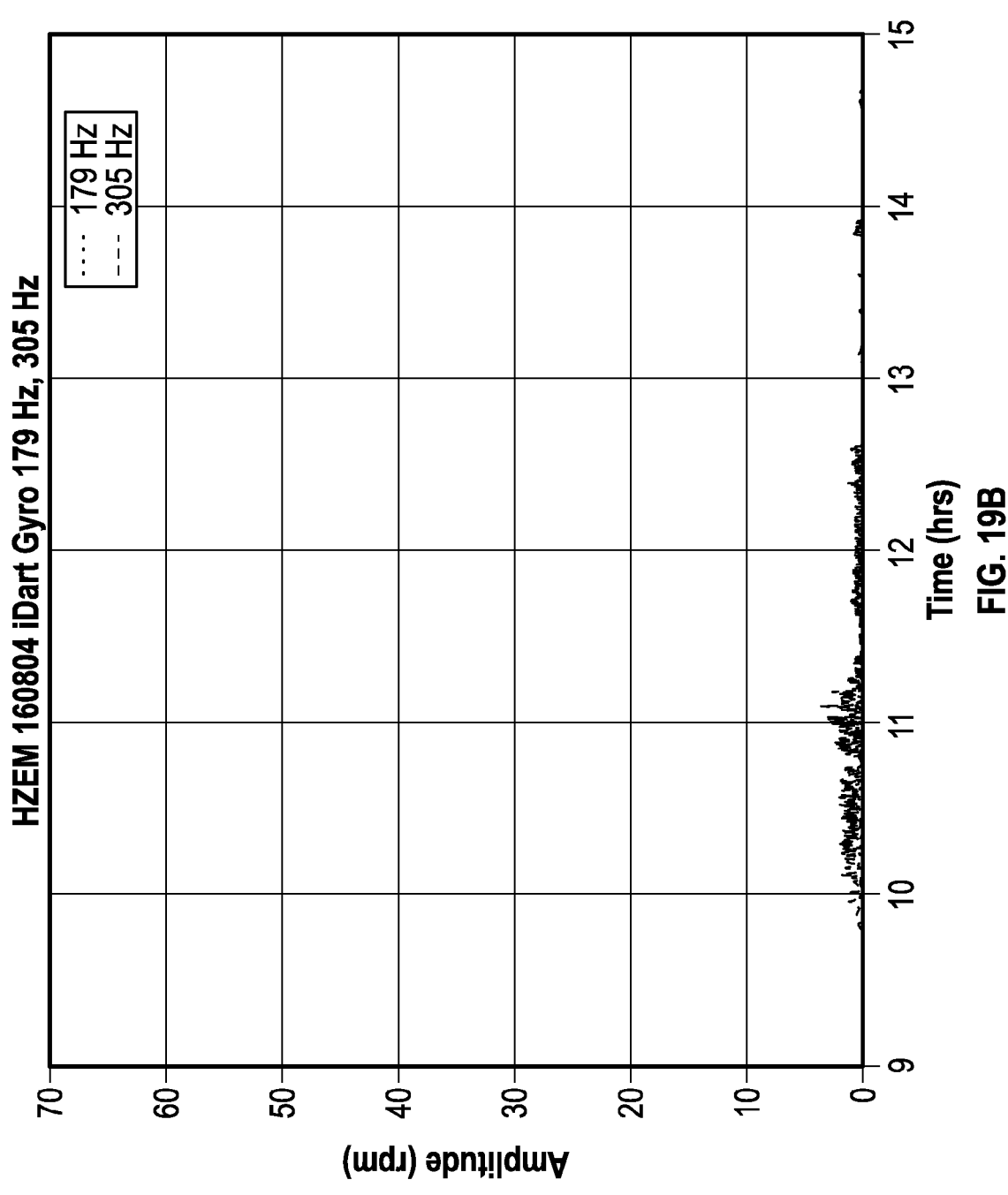
Figure 19C:
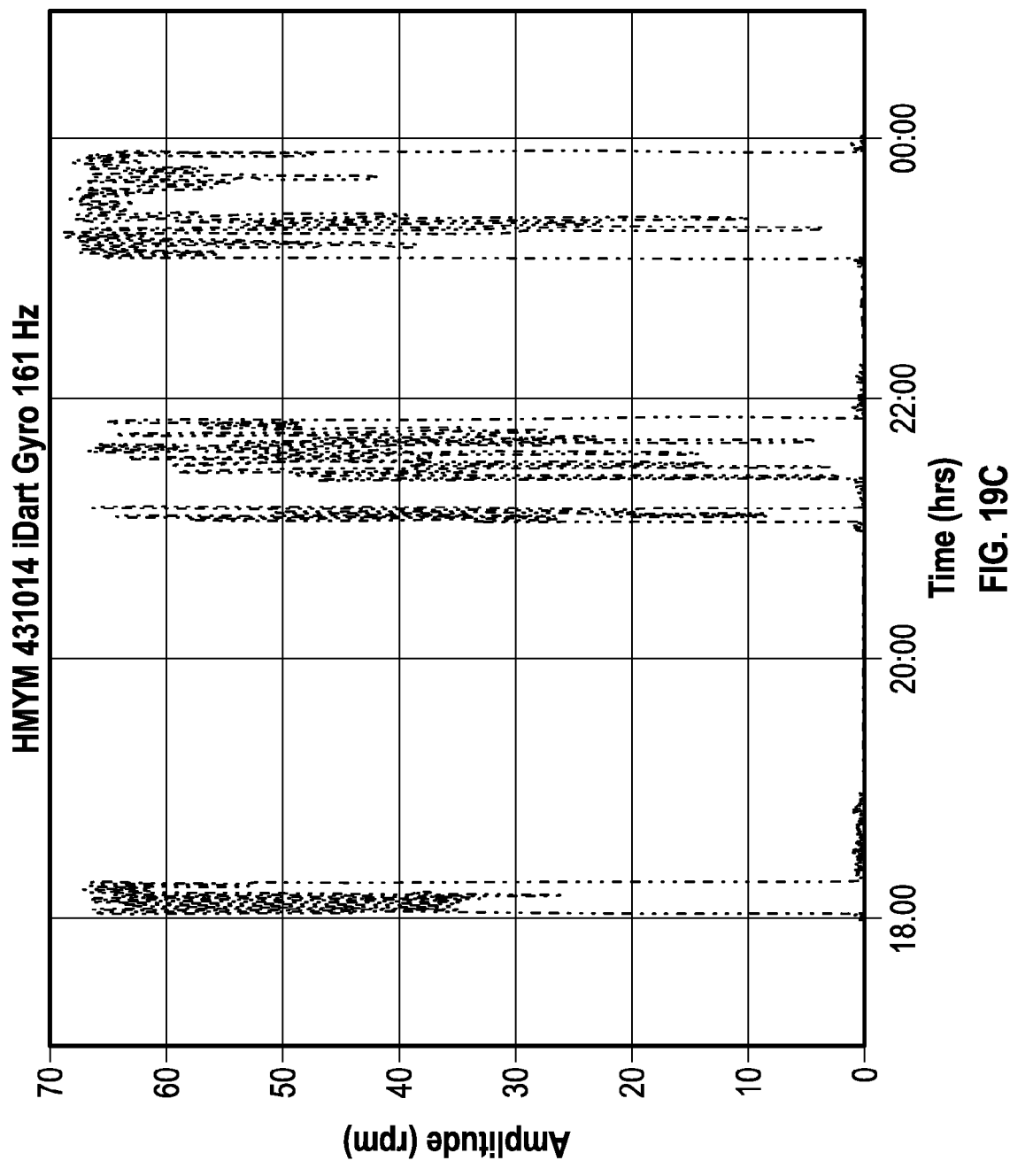

In an example test, a wear band was mounted on an MWD tool and on the downhole communication tool, which were carefully identified as actual contact points and not just points adjacent to a large diameter component. The results are summarized in Table 3 and FIGS. 19A to 19C to illustrate the impact of wear bands on HFTO amplitudes in three tests made using the same RSS tool. In a cartoon sketch at the top of Table 3 are, from right to left, the bit, RSS, and MWD. The wear band positions are shown in crosshatch on the outside of the tool.

TABLE 3

|  | | | |
|---|---|---|---|
| Contact above RSS | Slick - Saver sub | Wear Band on communication sub type 1 | Wear band on communication sub type 2 |
| Contact at MWD Short Wavelength | Wear Band | Slick | Wear Band |
| Frequency | 293 | — | 304 |
| Gyro | 36 | None | 2.3 |
| Torsional Accel Long Wavelength | 19 | None | 4 |
| Frequency | — | 161 | 177 |
| Gyro | None | 78 | 0.7 |
| Torsional Accel | None | 33 | 1 |

From the above, it can be seen that using a wear band can mitigate the HFTO, and in protecting multiple contact points the torsional oscillation is reduced by more than an order of magnitude and the acceleration by more than a factor of 4.

With the model shown in FIG. 7, the frequency of HFTO can be estimated based on the BHA components. Conversely if we have the HFTO frequency, either in real time or during post event analysis, we can use the model to characterize the location of the node in the system. This becomes a very powerful tool. In real time it allows the actual HFTO drivers to be identified and the appropriate mitigation recommended. This may include actions taken by an autonomous drilling system (e.g., control speed, activate active vibration dampeners, etc.), sending information to the surface for the driller to consider (e.g., HFTO flags, HFTO magnitudes, recommendations for actions, etc.). Pre-run or as part of offset well analysis (OWA) for future runs, it may also identify which components should be changed, diameters to be changed, features to be added, etc. to alter the contact characteristics to eliminate the HFTO. In the same or other embodiments, changes to the well profile can be made to minimize this disfunction.

With real time monitoring for HFTO frequency and amplitude, the drilling parameters (e.g., WOB, surface RPM) can be optimized to minimize HFTO while also reducing stick slip.

Accordingly, in some implementations, a model can be used to correlate BHA geometry to the frequency of HFTO. This model may also be used to measure HFTO frequency to predict the position of a node in the BHA. This information will identify which component of the BHA or of the operation is triggering the dysfunction and can be used to resolve how to fix the dysfunction in real time or for the next well.

An example model to link BHA geometry to the HFTO frequency is illustratively summarized in FIG. 7. This model is effective as a forward model to predict the frequency, but it is also accurate as an inverse model to calculate the position of the node in the BHA from a known frequency. This is useful in both real time as well as post event analysis as it allows the characteristics of the disfunction to be resolved and the mitigation steps identified.

Figure 20:
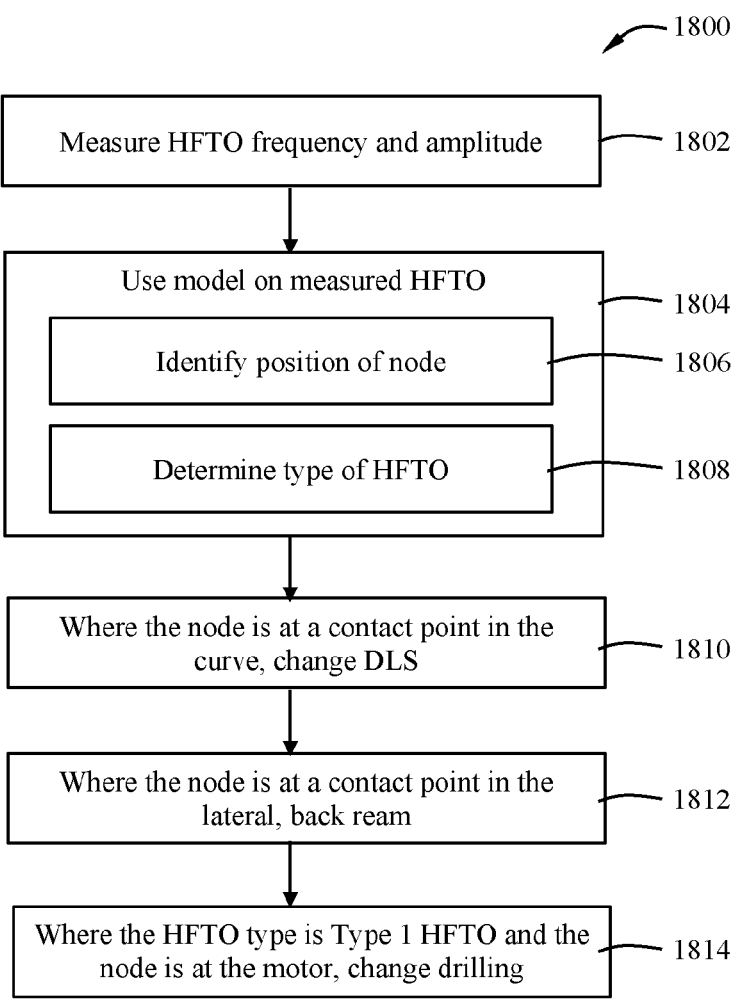
FIG. 20 is a flowchart for a method according to an aspect of the present disclosure.

An example of a real time workflow 1800 is shown in FIG. 20 and can include measuring the frequency and/or amplitude of HFTO at 1802. This can be done using any suitable sensor system and can be done in real-time. A model (e.g., the model of FIG. 4) can be used at 1804 in combination with the measured HFTO. For instance, a simple example of a model can include use of Equation 3 where the vibration frequency (f) is related to a constant (k), the distance between the drill bit and the first significant node (L), and the acoustic velocity (v). The model can be used to identify the position of a node at 1806 and/or the type of HFTO at 1808. In some examples, the model may identify the HFTO based on any combination of a mathematical model, clusters of prior data, and the BHA design to determine whether the HFTO is Type 1 HFTO or Type 2 HFTO.

After determining the location and/or type of HFTO, actions to take can be determined at 1810-1814. For instance, if the node is at a contact point in a curve, the DLS can be reduced or a recommendation generated to reduce DLS at 1810. If the node is at a contact point in a lateral, the bit may be contacting a stringer, and back reaming may be initiated or a recommendation to back ream may be sent at 1812. If Type 1 HFTO is identified and the node is at a motor, drilling parameters may be changed, or a recommendation to change drilling parameters may be sent at 1814.

For the case of post event analysis to re-design the BHA for the next well, an example workflow can include, among other things, using the node location to place wear bands, replace heavy weight drill pipe with collars or vice versa, reduce DLS for the next drilling process, or change lengths or positions of components to move nodes to less susceptible tools.

In a recent example, a tool suffered battery buckling failure and the drilling dynamics sensor showed HFTO at 80 Hz. Using the model of FIG. 4, the node was estimated at 70 ft. (21 m) from the drill bit. The BHA is shown in Table 4. As there is no motor, this was not Type 1 HFTO, and with the node at 70 ft. (21 m), it was located in the heavy weight drill pipe, which was not a contact point for Type 2 HFTO.

This was a new phenomenon. Notably, the transition from the collar with a 6.77 in. (17.2 cm) diameter to the pipe with a 5 in. (12.7 cm) diameter is at a cross-over and the torsional stiffness is proportional to $d^4$, so the actual stiffness ratio is more than 3. It is this transition which forms a reflection and hence the node. The mitigation for this BHA is to replace three heavy weight drill pipe joints with collars. These will have a similar outer diameter and torsional stiffness as the BHA and can mitigate the HFTO.

TABLE 4

| Desc. | OD (in) ID (in) | Max OD (in) | Length (m) | Cum. Length (ft) |
|---|---|---|---|---|
| 8½" PDC Bit | | 8.500 | 0.28 | 0.9 |
| 6¾" RSS \| 8½" | 6.732 | 8.375 | 4.26 | 14.9 |
| Stabilized CC | 4.200 | | | |
| Communication collar | | 7.000 | 3.02 | 24.8 |
| Drilling dynamics sensor collar | | 7.000 | 9.19 | 55.0 |
| Telemetry sub | | 6.770 | 1.73 | 60.6 |
| Save sub | | 6.770 | 0.40 | 61.9 |
| Float Sub | | 6.490 | 0.50 | 63.6 |
| 5" Heavy weight drill pipe (3 joints) | | 5.000 | 28.31 | 156.5 |
| 6.5" Jar | | 6.490 | 9.53 | 187.7 |
| 5" Heavy weight drill pipe (2 joints) | | 5.000 | 19.05 | 250.2 |

From the description herein, it can be seen that although HFTO may appear a very complex system whose behavior is difficult to predict, the underlying characteristics can be elucidated and the drivers causing such HFTO identified. Three different types of HFTO can be considered, which are referred to herein as Types 1, 2 and 3 HFTO.

For Type 1 HFTO (see FIG. 9), there is resonance of the stick out from motor to bit, HFTO couples to internal pressure perturbations at the motor, HFTO nodes are at approximately 40% of the length of the motor, the HFTO frequency is in the range 50-250 Hz, damage that occurs has been seen to include at least collar cracking and battery buckling, and mitigation includes use of conventional dampers below motor or reductions to the weight on bit.

For Type 2 HFTO (see FIG. 14), HFTO can be restricted to the lower BHA (e.g., below motor), and resonance is between bit and a contact point above steering tool. Stabs and short contacts do not form nodes, and the HFTO is independent of the presence of a motor in string. This HFTO is prevalent with high DLS tools or heterogenous formations and the frequency is often in a range of about 150-350 Hz. Conventional dampers above the MWD are ineffective with this HFTO and the damage has been seen to occur to rotary steerable tool internal components, back-off or board failures in MWD tubs, gap sub washout, or battery buckling. A mitigation effort can include use of wear bands at contact points to change node locations.

For Type 3 HFTO, the HFTO is seen to occur with a conventional steerable motor and it occurs while rotating or sliding. The HFTO includes resonance coupled from bit torque through internal pressure to WOB and bit torque. The frequency is in the range of 50-150 Hz and damage has been seen to include battery buckling. Mitigation can be done using vibration dampers or pressure wave attenuation.

Using the model herein, the HFTO and BHAs can be characterized. With the Type 1 we predict the frequency of the HFTO based on the distance between the bit and a point 40% up the motor. In short BHA strings we get the fundamental frequency while in longer BHA's we get the first harmonic. For Type 2 we use the same approach, but the Node is at the first slick contact point, which can be in the middle of a long flex joint.

Existing HFTO damper tools mounted above an MWD can be at least partially effective against Type 1 HFTO. However, as they are mounted above the MWD tool they are (usually) too far up the string to see any significant Type 2 HFTO, they are ineffective for Type 2 HFTO dysfunction.

For Type 2 HFTO, preventing the formation of a node will provide effective mitigation. Installing a wear band at the lower contact points will achieve this objective and mitigate the HFTO. With the HFTO model we can predict the HFTO frequency from a BHA description. Significantly, with the actual frequency we can characterize the dysfunction and prescribe a mitigation strategy.

Figure 21:
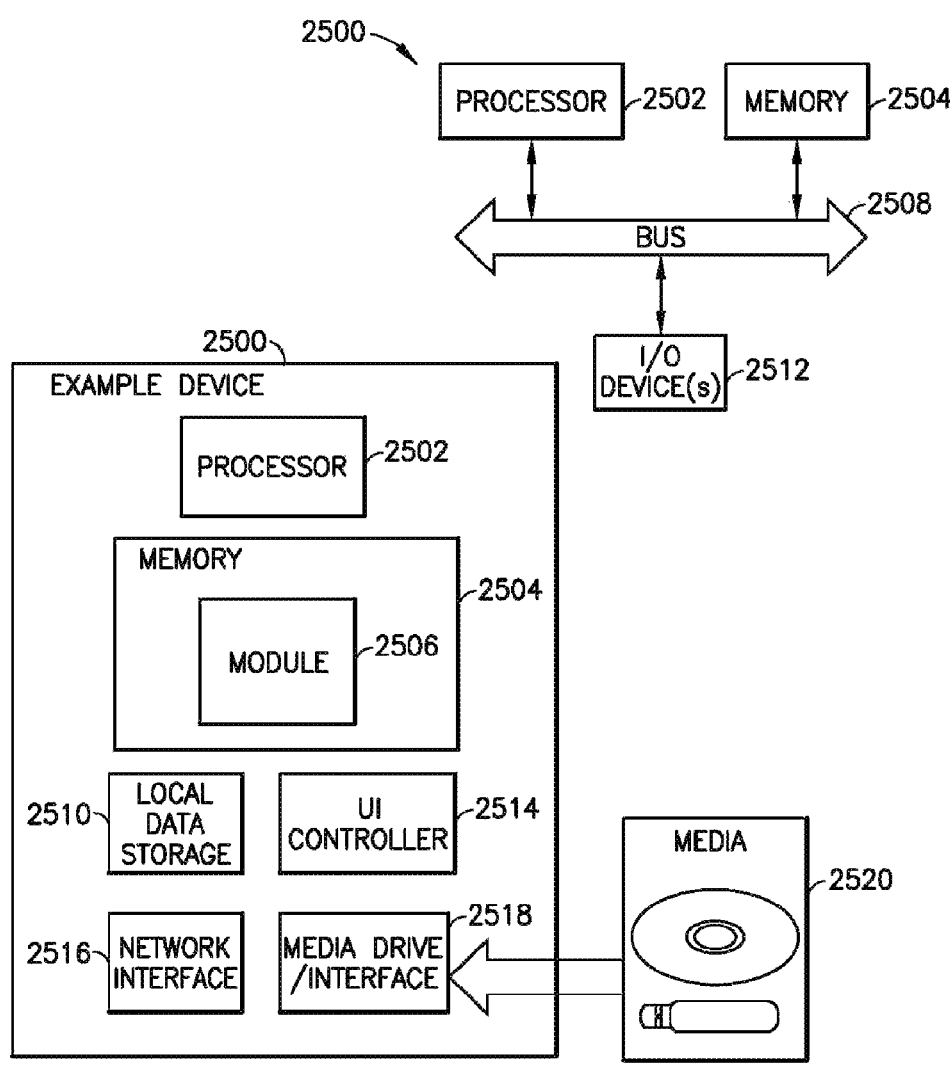
FIG. 21 is a block diagram of a computer processing system.

FIG. 21 illustrates an example device 2500, with a processor 2502 and memory 2504 that can be configured to implement various embodiments of the processes and systems as discussed in the present application. For example, various steps or operations of the processes or systems as described herein can be embodied by computer program instructions (software) that execute on the device 2500. Memory 2504 can also host one or more databases and can include one or more forms of volatile data storage media such as random-access memory (RAM), and/or one or more forms of non-volatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth). One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network. A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes and systems of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable, and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, general-purpose computer, special-purpose machine, virtual machine, software container, or appliance) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server over a communication network (e.g., the Internet).

In the description herein, various relational terms may be used to facilitate an understanding of various aspects of some embodiments of the present disclosure. Relational terms such as "bottom," "below," "top," "above," "back," "front," "left," "right," "rear," "forward," "up," "down," "horizontal," "vertical," "clockwise," "counterclockwise," "upper," "lower," and the like, may be used to describe various components, including their operational or illustrated position relative to one or more other components. Relational terms do not indicate a particular orientation for each embodiment within the scope of the description or claims but are intended for convenience in facilitating reference to various components. Thus, such relational aspects may be reversed, flipped, rotated, moved in space, placed in a diagonal orientation or position, placed horizontally or vertically, or similarly modified.

Certain descriptions or designations of components as "first," "second," "third," and the like are also used to differentiate between identical components or between components which are similar in use, structure, or operation. Such language is not intended to limit a component to a singular designation or require multiple components. As such, a component referenced in the specification as the "first" component may be the same or different than a component that is referenced in the claims as a "first" component, and a claim may include a "first" component without requiring the existence of a "second" component.

Furthermore, while the description or claims may refer to "an additional" or "other" element, feature, aspect, component, or the like, it will not preclude there being a single element, or more than one, of the additional element. Where the claims or description refer to "a" or "an" element, such reference is not to be construed that there is just one of that element but is instead to be inclusive of other components and understood as "at least one" of the element. It is to be understood that where the specification states that a component, feature, structure, function, or characteristic "may," "might," "can," or "could" be included, that particular component, feature, structure, or characteristic is provided in certain embodiments, but is optional for other embodiments of the present disclosure. The terms "couple," "coupled," "connect," "connection," "connected," "in connection with," and "connecting" refer to "in direct connection with," or "in connection with via one or more intermediate elements or members." Components that are "integral" or "integrally" formed include components made from the same piece of material, or sets of materials, such as by being commonly molded or cast from the same material, in the same molding or casting process, or commonly machined from the same piece of material stock. Components that are "integral" should also be understood to be "coupled" together.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

Although various example embodiments have been described in detail herein, those skilled in the art will readily appreciate in view of the present disclosure that many modifications are possible in the example embodiments without materially departing from the present disclosure. Accordingly, any such modifications are intended to be included in the scope of this disclosure. Likewise, while the disclosure herein contains many specifics, these specifics should not be construed as limiting the scope of the disclosure or of any of the appended claims, but merely as providing information pertinent to one or more specific embodiments that may fall within the scope of the disclosure and the appended claims. Any described features from the various embodiments disclosed may be employed in combination.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

What is claimed is:

1. A method comprising:

measuring frequency of high frequency torsional oscillation (HFTO) in a bottomhole assembly (BHA);

using a model correlating frequency of the HFTO to distance relative to a reference location on the BHA to identify a position of a HFTO node in the BHA;

when the HFTO node is at a contact point in a curve of a drilled wellbore, reducing dogleg severity or sending a recommendation to reduce dogleg severity;

when the HFTO node is at a contact point in a lateral of the drilled wellbore, back reaming or sending a recommendation to back ream;

when the HFTO node is in a motor of the BHA, changing drilling parameters or sending a recommendation to change drilling parameters; and after drilling, performing post event analysis and redesigning the BHA for a subsequent well, the redesigned BHA including at least one of different or additional wear band placement, replacement of heavy weight drill pipe with drill collars or vice versa, or changing a distance between components such that the HFTO node is located away from a sensitive component.

2. The method of claim 1, wherein:

the model includes a linear function that relates characteristic frequency for the HFTO to a length representing distance from the reference location on the BHA to a first significant node of the HFTO.

3. The method of claim 1, further comprising:

using the model to determine a type of the HFTO.

4. The method of claim 3, wherein the drilling parameters are dependent on determining a first type of HFTO that occurs above the motor.

5. The method of claim 1, wherein the model is correlated from experimental data representing different types of HFTO.

6. The method of claim 1, wherein the model is further based on an acoustic velocity.

7. The method of claim 1, wherein the model is further based on a constant.

* * * * *